(12) United States Patent
Gutbrod et al.

(10) Patent No.: US 7,539,645 B2
(45) Date of Patent: May 26, 2009

(54) METHOD AND APPARATUS FOR COMPUTER-IMPLEMENTED PROCESSING OF ELECTRONIC PAYMENT INSTRUCTIONS

(75) Inventors: Roger Gutbrod, Sandhausen (DE); Hans-Dieter Scheuermann, Birkenau (DE); Juergen Abt, Rauenberg (DE); Thomas Armbruster, Walldorf (DE); Martin Dedeke, Wiesloch-Baiertal (DE); Kurt Beifuss, Weinheim (DE); Markus Klein-Reesink, Walldorf (DE); Joerg Martin Haase, Dlelheim (DE); Karsten Soegaard Egetoft, Wiesloch (DE); Joerg Wegener, Nussloch (DE)

(73) Assignee: SAP AG, Walldorf (DE)

( * ) Notice: Subject to any disclaimer, the term of this patent is extended or adjusted under 35 U.S.C. 154(b) by 921 days.

(21) Appl. No.: 10/846,867

(22) Filed: May 17, 2004

(65) Prior Publication Data

US 2005/0010524 A1 Jan. 13, 2005

Related U.S. Application Data

(63) Continuation of application No. PCT/EP02/12920, filed on Nov. 18, 2002.

(60) Provisional application No. 60/331,470, filed on Nov. 16, 2001.

(51) Int. Cl.
G06Q 40/00 (2006.01)
(52) U.S. Cl. .................................................. 705/40
(58) Field of Classification Search .................. 705/40, 705/35, 39; 708/110, 134, 163; 707/3, 101, 707/102
See application file for complete search history.

(56) References Cited

U.S. PATENT DOCUMENTS

| | | | | | |
|---|---|---|---|---|---|
| 4,727,243 | A | * | 2/1988 | Savar | 705/17 |
| 4,742,513 | A | * | 5/1988 | Reichard et al. | 370/449 |
| 5,339,434 | A | * | 8/1994 | Rusis | 709/246 |
| 6,289,322 | B1 | * | 9/2001 | Kitchen et al. | 705/40 |
| 6,868,402 | B1 | * | 3/2005 | Hirota et al. | 705/40 |

OTHER PUBLICATIONS

Nuts and Bolts of Transaction Processing, published 1999, retrieved by Examiner on Jan. 13, 2009 from http://www.subbu.org/articles/nuts-and-bolts-of-transaction-processing.*

* cited by examiner

Primary Examiner—Mary Cheung
Assistant Examiner—Brian Fertig
(74) Attorney, Agent, or Firm—Kenyon & Kenyon LLP

(57) ABSTRACT

Method and apparatus for the computer-implemented processing of electronic payment instructions, wherein in a first step total instruction data contained in a payment instruction are analysed in an instruction input processor and separated into payment instruction data which are needed for processing the payment instruction and accounting data which are not needed for processing the payment instruction, the payment instruction data being converted into a uniform metaformat for processing in a subsequent payment processing apparatus (payment engine) and the accounting data being stored temporarily in a data bank together with linkage instructions, in a second step the payment instruction data converted into the metaformat are processed in the subsequent payment processing device, while, for each payee, there is automatically a routing identification and a clearing identification and, depending on the clearing identification, internal preparation of the payment instruction entry, and in a third step the automatically generated data relating to an outgoing payment instruction are converted in an instruction output processor into a target data format and are supplemented by the data which have been temporarily stored in the data bank.

20 Claims, 15 Drawing Sheets

FIG. 14

METHOD AND APPARATUS FOR COMPUTER-IMPLEMENTED PROCESSING OF ELECTRONIC PAYMENT INSTRUCTIONS

CROSS REFERENCE TO RELATED APPLICATIONS

This application is a continuation of International Application No. PCT/EP02/12920, filed Nov. 18, 2002, which claims the benefit under 35 U.S.C. § 119(e) of U.S. Provisional Application No. 60/331,470, filed Nov. 16, 2001, all of which are hereby incorporated herein by reference.

BACKGROUND OF THE INVENTION

Currently, banks operate in their application landscapes with a number of product-or savings-specific systems. The running of these is cost intensive and cannot be scaled up. Accordingly, there is a need in the art for a system and method that simplifies running processes and substantial product savings neutrality within the scope of the banking business, for example.

SUMMARY OF THE INVENTION

The present invention relates to a method and an apparatus for the computer-implemented processing of electronic payment instructions.

According to an embodiment of the invention, electronic payment instructions are analysed in a first step in an instruction input processor (input processor). In the course of this analysis the total instruction data are separated into payment instruction data which are needed for processing the payment instruction and accounting data which are not needed for processing the payment instruction. The payment instruction data needed for processing the payment instruction are then converted into a uniform metaformat for processing in a subsequent payment processing device or payment engine. The accounting data not needed for processing the payment instructions are stored temporarily in a data bank together with linkage instructions. The converted payment instruction data are then processed in the subsequent payment engine in which, for each payee, there is automatically a routing identification and a clearing identification (clearing consent) and depending on the clearing consent, internal preparation of the payment instruction posting. Finally, the data relating to an outgoing payment instruction, generated automatically in the payment engine, are converted in an instruction output processor (output processor) into an individual target data format specific to the payee and are supplemented by the data which have been temporarily stored in the data bank. The procedure according to the invention brings about a reduction in the hardware necessary for computer-assisted processing of payment instructions, a substantial reduction in the processing work to be done by operating staff and also a considerable reduction in the data which are to be processed as the payment engine is a simple process control without any accounting knowledge, which means that there is less redundant data.

According to an embodiment of the invention, the originator of the payment entry is automatically checked and, if the check is positive, the payment instructions are immediately passed on to the instruction output processor.

According to an embodiment of the invention, the internal preparation of the payment instruction entry is an internal reservation of the payment entry, which may be an originator-oriented and/or a receiver-oriented reservation. This makes it possible to automatically generate collective instruction entries, as reservations of an originator and/or a receiver can be accumulated, combined with the accounting of all the payment entries of an originator or receiver at a given time, particularly after a certain length of time has elapsed (e.g. at the end of the working day). However, it is also possible to make the time dependent on the reserved amount which has been run up.

According to an embodiment of the invention two or more payment engines according to the invention are combined in one computing centre.

The invention clearly also extends to computer programmes with programme coding means which are suitable for carrying out a method according to the invention when the computer programme is run on a computer, and to computer-readable data carrying media with computer programmes according to the invention stored thereon and to computer programme products with computer-readable data carrier media of this kind.

Further features and embodiments of the invention will become apparent from the description and the accompanying drawings.

It will be understood that the features mentioned above and those to be described hereinafter may be used not only in the particular combination given but also in other combinations or on their own without departing from the scope of the present invention.

BRIEF DESCRIPTION OF THE DRAWINGS

The invention is schematically illustrated by means of an embodiment shown in the drawings and is hereinafter described in detail with reference to the drawings.

Figure 14:
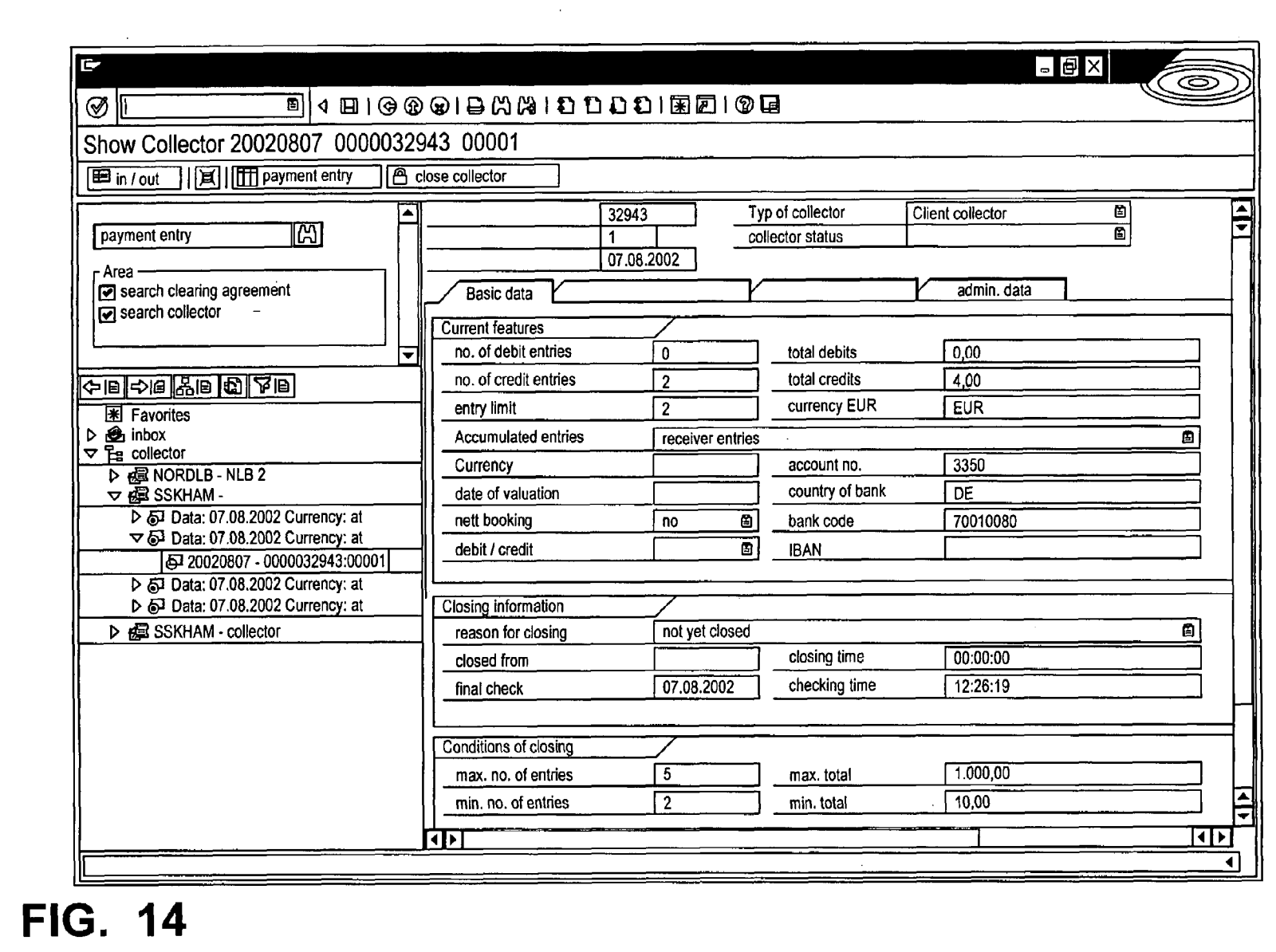

FIG. 14 shows a screen shot with a collective overview of the payment engine in the basic data field.

DETAILED DESCRIPTION

Figure 1:
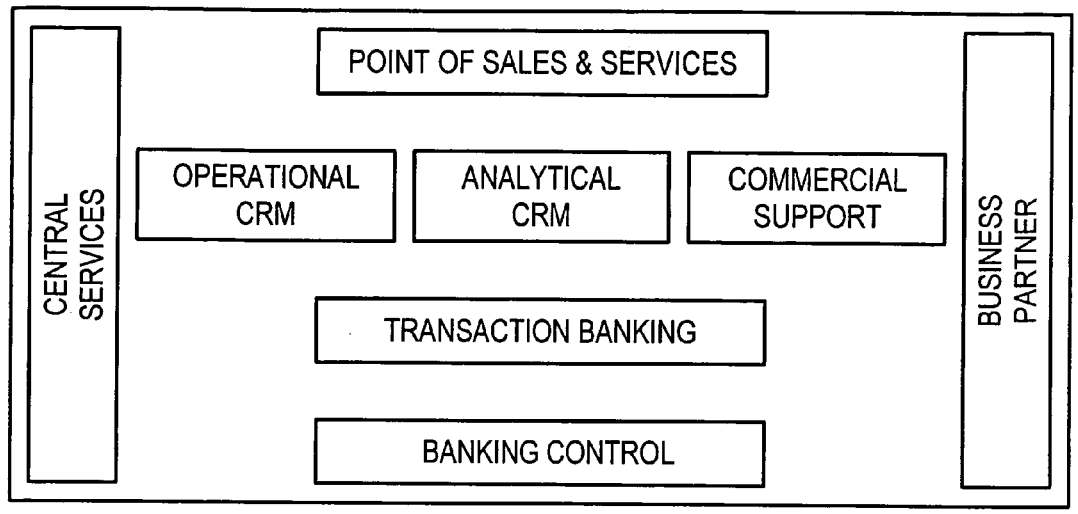
FIG. 1 is a block diagram of a target application landscape according to the invention.

First of all, the technical environment of the invention will be described.

The results of detailed analysis of the market, in collaboration with international banks and consultancies, are reflected in the current software solutions used by the applicant and further development projects. On the basis of this collaboration in recent years a target application landscape for banks has been developed which is based on the needs of the international finance markets. The individual applications of this software architecture constitute solutions and integral parts of solutions of the so-called E-Business solution MySAP Banking. Essentially, MySAP Banking can be divided into the areas of core banking, SEM for banks and CRM for banks.

Applications are information systems which solve a primary problem of operational economics and which can be implemented per se. They contain the data and functions to solve the primary problem, i.e. they combine activities which are closely related in subject matter. An application communicates through defined interfaces. As a rule an application is a marketable solution. Examples are Product Account Management, Profit Analyser and Risk Analyser.

In the following embodiments applications are divided into core applications and accessory applications:

Core applications are the main applications of the application landscape. Accessory applications are supplementary applications which widen the scope of function of core applications (including more than one). They perform special tasks (examples include limit determination and scoring models) and have their own investment cycle independent of the core applications. This ensures greater flexibility in adaptation to changing political targets in business.

The application landscape of the e-business solution mySAP banking describes the essential applications needed to operate the banking business. The applications are connected according to operational economic logic.

"Technical Architecture" describes the linkage between applications by a middleware. "Application Architecture" describes the business management content of individual applications and the logical interplay of individual parts of an application. These parts are known as components.

The applications of SAP are constructed according to a shell model: In the nucleus is the solution for the international use of the software and as a supplement to this country-specific solutions are provided. Individual customer supplements may be added on in another shell based on BTEs (Business Transaction Events) or BADIs (business Add-Ins) or the use of BAPIs (Business Application Programming Interfaces).

Financial Institutions and Banks make the following demands of applications:

Customer-centred and distribution method-neutral support for the sales/service processes.

Fast reaction to system demands for the development of new products.

Possibility of integrating new business processes.

Product division-neutral development of contracts and unified stock control.

Integration and consistency of internal and external billing.

The following demands are made of the application landscape:

Flexible modernisation of the application landscape for years to come (depending on the investment cycle of the applications).

Fast reaction to changing business models (e.g. Outsourcing, Insourcing).

Client-specific expansion possibilities without modifying the standard solution.

Support for different migration scenarios.

Flexible integration into existing application landscapes in banks.

Reduction in the interface complexity by integrated processing within the SAP application landscape.

The result of this, for the application landscape sought:

The individual applications are interchangeable and expandable. In particular, individual applications should not be too extensive. In an integrated system landscape of the SAP individual applications must be able to be deactivated and foreign applications must be able to be integrated.

The bank decides by the choice of applications on the desired extent of standard functions.

Each application must be capable of being expanded so that integration in client-specific application landscapes can be developed by the SAP, by certified partners or by the clients themselves.

Clear Competence of Applications

If we look at central bank processes, various tasks and information requirements can be derived. These different requirements conflict with one another to some extent and form an obstacle to the optimum construction of individual solutions. Thus, a client-centred processing is the demand for distribution and service organisation in a solution. The cost-reducing developing of contracts and accounts, on the other hand, is contract oriented. Internal and external billing in turn aligns the processes with legal and organisational conditions.

Applications communicate through public interfaces. No direct access is allowed to applications. This ensures that data exchange can take place transparently between applications. Within an application a consistent database is guaranteed. Unexpected risks caused by unknown linkages and access can be minimised. This communication structure allows direct data exchange between applications through public interfaces or indirect data exchange through public interfaces and business management middleware. For example, the Posting Control Office can communicate with the account management through public interfaces; however, the data exchange may also take place via middleware with its own business intelligence.

Middleware is a central element for implementing an application landscape. Middleware can perform two functions:

Technical communication (services)

Business management control (Business Rules)

There are various solutions on the market for technical communications, this allows the exchange of information between different data banks in different formats.

Business management control of business cases demands a regulating mechanism. This is defined as the Business Rule. Process knowledge which covers the application is necessary in order to implement the Business Rules.

Elements of the Business Rules are process objects which initiate the call up of business objects in the individual applications. Examples include "contract arrangement": this refers for example to the business objects of business partner, contract and card product. The imaging of front ends and back ends using Middleware is a widespread practice. However, it is also necessary to back up back end processes between applications, something which is not well established. Therefore, for reinvestments in these fields it is essential to have a clear concept of process control.

This construction also allows stepwise migration with successive opening up of new applications.

For SAP the interplay of applications and Middleware has a strategic significance and is currently being actively promoted. Within the scope of the analysis of technical feasibility the question of performance plays an important role.

The structure of the target application landscape shows "key functional areas" with which the bank management solution fields can be imaged. Within one such area there may be a number of applications. The area which contains applications that banks require in order to carry out their secondary processes, such as for example personal finance, systems accounting, material management, etc, is not shown.

The basis for this structure is the goal of defining areas of application on a high level which serves a specific main purpose. In this way it is possible to derive applications and define clear competencies. Redundant applications and functions can be avoided. The landscape of the following main functions is well known:

Applications for client-centred performance of sales and service processes.

Applications for carrying out and monitoring trade processes.

Applications for contract-centred high performance working.

Applications for legally and organisationally induced data calculation and preparation for bank control.

Applications for the central preparation of data which supports the other areas to an optimum degree without being redundant.

FIG. 1 is a diagrammatic view of a block diagram showing a target application landscape for account management according to the invention.

In the top level of the block diagram in FIG. 1, in the box "Point of Sales and Services" is the customer interface to the sales and service department of the bank, such as the call centre in telephone banking or a subsidiary branch.

In the second level of the block diagram under "CRM" are stored data relating to the client, operational data being data regarding existing customers, analytical data being data on the acquisition of new customers.

Finally, in the third level of the block diagram, under transaction banking, are shown contracts with clients. These contracts relate to accounts, borrowing, securities, payment transactions, deposits, etc.

In the bottom fourth level is the bank control.

Every bank communicates with the markets and requires interfaces for this purpose. As a rule, value-added business and business transactions are generated from this interface. It is of central importance for a bank as it also represents its image. Obviously, these interfaces are numerous. The following may be mentioned as essential interfaces:

Personalised two way communication: Branches, call centres, processing offices and dealing rooms. At these interfaces documents and other rule confirmation of the results of communication are necessary. This form of communication is generally very staff and cost intensive.

Personalised one way communication: SB-terminals, internet, telephone. Here, a party takes action by inputting data and receives a system generated result. In this case the bank is represented not by its employees but by the system reaction.

System operated two way communication: electronic dealing systems, clearing systems, payment handling systems, market data input, data exchange with information bureaux, notifications to supervisory authorities. Here, the bank employees only take manual action in the event of a fault.

Whereas in the handling of payments system-operated data exchange has been continuously worked on in recent decades, in terms of customer care there was an innovative breakthrough only with the advent of direct banking. This breakthrough was accelerated by the internet and, after retail business (online banking) now encompasses wholesale business (e.g. accreditive processing) and dealing (e.g. increases in issues; increase in electronic trading places).

These new interfaces have to be integrated into the existing IT landscape of a bank. Therefore, it makes sense to uncouple the distribution channels and encapsulate them so that it is possible to adapt to the rapidly changing trends. This rapid reaction time can only be achieved if as little business management logic as possible is contained in the front ends and is located in an application area which is "distribution route-neutral".

The front ends are supposed to encompass all the client-initiated business. Only in this way is it possible to make use of synergies and process optimisation of a modern software solution. Moreover, the organisational decision to leave certain business transactions to be done directly by the customer can be put into practice more easily (e.g. the now common use of ATM terminals or internet or mobile phones for giving payment instructions, ordering foreign currency, etc).

Between the forms of communication there is a network. Thus, for example, telephone users can be connected to a call centre by the click of a button if they experience problems in inputting data. Against this background it is all the more important to maintain data through all distribution pathways at a uniform status so that all employees are informed as to the activities and history of the client.

Customer Relationship Management (CRM) encompasses the whole range of analysis, activities and documentation in the field of client contact. Thus, not only are sales processes and the associated marketing relevant but also services throughout the period of the contract. CRM is more than a databank with marketing data for SAP. It includes operative processes with corresponding data management. Many functions are present in redundant form for each channel in market solutions of this kind. The goal of SAP within the scope of CRM applications is to achieve immediate availability of business and distribution functions independently of the distribution channel.

In operational CRM the following processes can be defined:

Distribution processes (sales processes) are focused on the acquisition of new business, on the one hand from the client base and on the other by attracting new customers. Depending on the business field (retail/wholesale), the product (payment transactions/active or passive business or business on commission) or customer group this process has different degrees of complexity, risk and yield.

Service processes include customer care during the life-cycle of the contract. The main points include: the desire to block cards, changes of address, complaints.

For mapping the processes described above the following client-centred solutions which are distribution route-neutral are needed in this range of applications:

Contract management supports the drawing up of the request and offer and the conclusion of the contract including correspondence and electronic files. Contract management shows the contractual agreements between the bank and client, in customer-centred manner. The contracts may have any desired degree of complexity. For example a credit agreement secured by life insurance and security in the form of a guarantee may be mentioned. If the contract data are called up, they contain a selection of information relevant to processing supplemented by distribution and service-oriented data. These contracts may be processed by means of a number of applications, i.e. the relationships between individual contracts or partial contracts are documented throughout their entire life. Customer-centred sales and service processes are "anchored" in the contracts of the contract management.

Important processes:
Concluding and documenting the contractual and pre-contractual customer agreements.
Monitoring the content and dates of contractual and pre-contractual terms and events (e.g. conditions for payment; lack of legitimation; extension deadlines).

In product management market related configuration of products takes place. This process is carried out in accordance with the processing area of a bank. The preparation of products in this field of application is concentrated on the market presentation of these products, i.e. on the varying forms which a customer can choose. The product must support mass business in the retail business and guarantee a unified product portfolio and hence contractual portfolio. The degrees of freedom of individual products are generally limited (e.g. as a rule the only variable parameters of a savings bonds are the nominal amount and its term). By contrast with the retail business the wholesale business has high degrees of freedom within the product as the contractual agreements must allow for highly individual forms.

Important services:
Configuration of the product parameters
Product calculation

Activity and contact management makes it possible to detect, monitor and control activities with the customer. Moreover, all contacts with the customer are documented and can be evaluated according to various features. The bank has a "virtual" customer representative who is available through all the distribution channels. For example, a complaint made through the call centre is also visible to the employees at the branch. This ensures a uniform status of information for all the employees who come into contact with the customer. The customer activities on the internet are also to be integrated into the contact management.

The application area "Analytical CRM" includes the processes of analysis for using business and customer potential and converting them into operational use (e.g. marketing measures).

Analysis processes form an essential aspect of an efficient customer relationship management. These include processes such as, for example, cost information for controlling service, marketing and sales actions, customer-specific characteristics for determining further customer potential, information on competitors' products, etc. The primary functions of analytical CRM are:
Customer segmenting and profiling
Campaign Management
Database Marketing Corresponding solutions support the bank in planning and carrying out marketing measures, begun in the segmenting and profiling of customer bases up to the planning, carrying out and monitoring of marketing campaigns.

CRM is of strategic importance according to the invention for offering total solution competence.

Applications for supporting trading activities are characterised by high product specialisation. Special know how and short investment cycles are the marks of these solutions. To some extent the existing systems still imitate the back office processes. A clear cut makes it possible to process handling and billing processes in cost-decreasing manner. Trading systems often have rudimentary risk monitoring. Banks are increasingly being required to provide the instruments of control of the overall bank control directly in value added manner in the trade area.

Important processes in this area are:
Product configuration for trading
Contract management for trading
Limit management for trading (exposure management).

According to the invention it is not a trading system that is provided but rather the trade activities are monitored.

In the field of transaction banking the starting position is as follows: globalisation of the banking market expresses among other things the intention of market participants to have efficient operating magnitudes. In order to make full use of the effects of scaling and specialisation in recent years a partly internal and partly overarching separation of distribution and transaction banks has developed. Outsourcing solutions are one example of how the transaction bank has succeeded as a business model in its own right. However, while maintaining the running within their own businesses attempts are made to optimise the running of customer business by automation and centralisation.

Currently, banks operate in their application landscapes with a number of product-or savings-specific systems. The running of these is cost intensive and cannot be scaled up. Simplifying running processes and substantial product savings neutrality within the scope of the banking business are major requirements in this field. The configuration of handling processes is supposed to be accelerated and made more flexible by product configuration. The possibility of expanding the software is of crucial importance in this field of business particularly taking account the long investment cycle of 15-20 years.

For the SAP this field of application provides a major strategic contribution to optimising the process in the international banking world. The field of transaction banking has the essential components of payment transactions, account management (handling and stock control), securities settlement and deposit administration (handling and stock control).

Account management has the task of running the legal position in the matter of cash flow, i.e. it provides information as to the requirements and obligations of the bank to third parties. The stock control of account management is the source of bank statements and notifications of balance. The balances and turnover entries are clear of currency, i.e. unconverted. The status is the basis for the external billing, i.e. the contractual and turnover data held here from the database for drawing up the balance.

In account management there is also the handling of (partial) contracts. Partial contracts because a customer contract can be divided up into a number of handling applications owing to its complexity. For example, in operational CRM, a product may consist of a "salary account with credit card and travel insurance". Whereas the salary account is managed in account management, the handling of the card is carried out by a provider and the travel insurance by a partner. The handling functionality means that automated extensions or contractual billings are carried out. This means for the operational CRM that it must obtain the up to date state of the account from the management.

In account management only legally valid contracts are managed, i.e. simulation business, offers and requests are outside, in operational CRM.

Payment transaction systems are conventionally country-specific solutions. The payment transaction system takes on the formal checking and if necessary the consolidation and distribution of turnover within the routes and formats used by the bank (internal and external routing).

Payment transaction systems conventionally work by the so called batch method. As a supplement, payment instructions must also be given in dialogue form to initiate immediate real time accounting in account management (additional application in payment transactions). Between payment transaction systems and account management a high performance communication must be provided.

Fundamentally, within the scope of the present invention, the management and execution of long term instructions is an additional application in payment transactions (payment instructions and long standing instructions fall within account management). However, it is also possible to carry them out as an additional component within account management (e.g. payment transfer within account management).

The field of transaction banking contains, in addition to the solutions described above for the money side, solutions for security business and derived financial transactions. Thus, it can be assumed that as a rule there are a number of stock control systems in this field. In the management of securities (securities settlement "management of deposits") there is the peculiarity that within the scope of the customer business this is a stock control which is not on the balance sheet.

The business partner solution is a central application for storing and managing all customer information. This solution is very closely linked to the solutions for operational and analytical CRM. Because of the process linking the business partner is serviced within the scope of these processes. The business partner data constitute an important immaterial asset for every bank the value of which is determined by the quality of the data.

The business partner application combines the customer data of a bank in a manner which transcends the application. The most important data are:

Name and address of the business partner

Additional data depending on the type of business partner (e.g. date of birth; legal status) for all fields of application (e.g. branch key for marketing selection or communications)

Relationships (e.g. borrower unit; concern structures)

Roles

Legitimation data

Creditworthiness data/data from credit reference agencies/scoring results/marketing cluster Data of budgetary account or balance sheet analysis Total debts Links between business partners may be connected with one another in many ways. Functions are provided for forming borrower and risk units.

Customers go to a bank in defined roles (e.g. account holders, borrowers, guarantors). For this reason the business partner application includes the role of a customer as an important component.

The application range "central services" contains solutions which support the banking business of the other areas.

Security management

Output and input management/correspondence

Market data, data of origin of securities, information services

Administrative services: authorisations, organisational units

The administration of securities is of particular importance as a result of the Basle Decisions on risk exposure. By differential allocation of securities a bank can optimise its own capital position and thus reduce its credit cost. Moreover, knowledge of securities and their value is one way of acquiring new business. Recording securities is generally done during the initiation and conclusion of a contract and is initiated from the operational CRM. The clearing of securities is carried out in the course of winding up a contract.

The management of securities includes on the one hand securities which the bank receives and on the other hand securities which the bank itself provides. This second aspect is not currently available on the market in virtually any solution. However, activities of a bank in the derivative field also require documentation and control of securities which they themselves set up.

Management of securities is an important component of the overall solution.

The application of output management/outgoing correspondence constitutes a solution for optimum communication with the customer. Various media are used such as the postal services, fax or e-mail. There may be some dependencies between the media. Statutory notification periods must also be observed (e.g. written notice of the closing of an account).

In addition to the choice of output media a high functionality is needed for controlling and preparing paper correspondence. The key words here are central printing; forms and rationalised postage.

The invention assists the correspondence-oriented data selection and preparation. Further processing in a printing and despatch line is carried out by special suppliers.

The function "electronic file" belongs to input management/incoming correspondence, as does the general linking of documents to the objects of contract, business partner, etc. Input management has become a central service in operational CRM.

This relates to solutions which provide information on a number of applications within a bank.

The services referred to as "administrative services" serve to organise the running of the banking business.

The existing system landscapes have grown up historically in most banks. The operational systems play a central role and deliver downstream systems, often with pre-calculated results. These frequently produce different results and a complicated process of transmission and adaptation. It is no longer possible to make decision within a short space of time. The control of a bank is therefore required to have a single source for the database and consistency of methods through all the evaluation processes. In order to achieve the goal of matching the data and methods, the systems of a bank must be organised differently from hitherto. In particular, a clear distinction must be drawn between the operating systems and the applications of the overall bank control. This freeze the operating systems from the downstream processes of the overall bank control and at the same time centralises the processes. The data required by the operating systems are made available at a data interface.

The bank control relates not only to individual institutions but to entire concerns. Precisely for control throughout the concern, unity and transparency of methods and their presentation are of great benefit.

The following fields are integrated in an overall bank control according to the invention:
  Balancing of accounts
  Profitability/controlling
  Active/passive controlling
  Risk controlling
    Market risk/internal models
    Credit/loss of address risk
    Contractor risk
    Country risk
  Communications
  Limit management (analytical)
  Transaction banking has the following central tasks:
  Controlling the trade in money and securities
  Handling the contractual position
  Turnover management and running of the legal position in terms of money and securities The scope of the solution of transaction banking will be described hereinafter.

In order to embed the functionality of transaction banking in the overall context of the application landscape we will first discuss the following aspects:
  Processing options
  Data management
  Product configuration and financial conditions Processing Options As an application in its own right transaction banking needs to be able to be processed directly. The reasons for this may be:
  Disposition and limit management on the quality control of the position.
  Dealing with complaints, such as correcting fees.
  Stock control processes, such as for example the processing and agreeing of CpD accounts.
  Making corrections on the basis of incorrect or inadequate data input (e.g. value corrections, accounting corrections)

Traditionally, account management is referred to as an add-on to customer care. The invention is designed so that implementation of the account manager is possible. This role comprises the following two fields of work:
  On the one hand, they are activities which act directly outwards to the customer (e.g. lowering of limits) and on the other hand activities which affect only the portfolio "without customer contact" (e.g. CpD processing, data correction).

Primarily, distinctions are drawn between two types of processing layers in transaction banking:
  Basic Maintenance Interface (BMI)
  Handling Office (Account Management Office/AMO)

The Basic Maintenance Interface is an interface for processing individual functions.

This interface allows manual intervention into otherwise largely automated transactions. All functions from this area therefore have an interface. A clearing process guarantees properly revised processing. A clearing tool which is tied into the individual applications in the system is suitable for this.

This interface is made available as standard and the correcting profiles for these work spaces can be defined by the user as roles, so that each user is provided with a menu which precisely satisfies his requirements as to the system.

These interfaces do not take account of any customer-organisational processes or improved running.

The Handling Office (Account Management Office/AMO) guarantees process controlled, i.e. workflow-aided processing of business incidents. Within the office there are different role-based functions. The control is assisted by adjustments to the SAP workflow in accordance with individual customers and associated clearing processes (4to 8-eye principles). Compared with the basic maintenance interfaces these offices have their own data management (e.g. disposition orders). Access to functions and data for processing the business incidents, extending beyond the application, is crucial to tying in the office. Moreover, the results of the office activities should be transmitted to the central contact management so as to allow a fully client-centred view right through the bank.

In management today there are frequently processes which do not belong in this category (e.g. opening up an agreement by post).

Market studies have additionally shown that the aim of banks is to slim numerous back office processes by 70-80% purely by shifting them onto the customer, as is already done by internet banking (e.g. opening up an agreement). Management is only at its most efficient when the customer of the bank can himself initiate business such as for example blocking a card or can arrange for payment instructions.

Guiding Data Management

In every application landscape there can only be one "master" for the data to which other applications apply directly or obtain periodic updates.

The master for the partial agreements which are to be handled is in the account management, i.e. the appropriate contractual data and conditions are deposited there.

The same is true of turnovers and balances. Therefore, on this basis, data is prepared for the bank statements and for a data warehouse.

The extent to which applications have to hold redundant data is determined largely by the performance requirements and depends on the individual customer's situation.

Product Configuration and Financial Conditions

Product Configuration

As shown in the target application landscape, product configuration is a central theme in a modern solution looking towards the future. Product configuration comprises three essential aspects:
  Product configuration in the operational CRM. Here, product configuration is oriented according to the requirements of marketing and sales.
  The formation of the handling product with all the control parameters relevant to this handling within transaction banking/account management. A product presented to the market can be divided into a number of partial products for handling.
  The configuration of products for bank control. These products generally have a different granularity from the handling products. Data management is also aligned with the needs of evaluation and not the requirements of handling.

In the three main processes of banking the product is differently emphasised, with the exception of one area: "the financial condition of the product". For this reason the financial conditions are additionally shown.

Finally, the product configuration extends over all three fields of application. Overall coordination between the fields of application is essential within the framework of the implementation of a new product. The products are promoted in each area per se:

In transaction banking the product promotion takes place through customising. Authorisation and clearing are ensured by means of the transporting methods of SAP.

The connection between operational CRM and transaction banking is obtained by making a specific contract with a client through a public interface (BAPI). The following are given at the interface:

the customer the product ID and the individual terms of the contract.

The product ID provides the connection with the (partial) handling product.

Financial Conditions

The financial conditions are the basis for calculating interest and fees. They are therefore particularly important and must be available in every field of application. Access is critical to performance within the scope of stock control. In order to guarantee that the conditions remain consistent beyond the limits of individual fields of application, SAP makes the financial conditions of account management available to all other applications through BAPIs.

Figure 2:
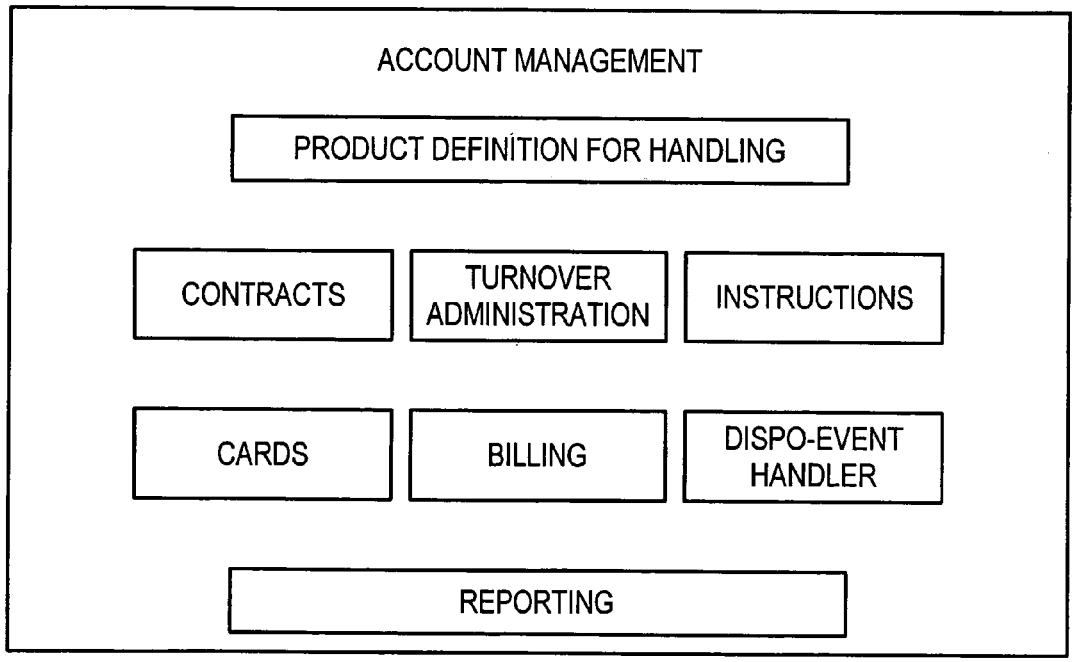
FIG. 2 also shows, in the form of a block diagram, the components of the account management according to the invention.

FIG. 2 illustrated by means of a block diagram the components of account management. Account management has a product savings-neutral structure. First of all payment transaction products and services as well as passive and active products of retail banking are in the focus of development.

The contractual component is designed as a framework. It is therefore possible to use it as a central service for all applications of the target application landscape.

It is conceivable that the contract and its framework may in future be used as the central service for all applications of the target application landscape.

The contract manages all the basic data relevant to handling in the account management by means of contractual components. Contracts use products as their basic ingredient. The contract is directed to the highest possible performance in running mass business.

Freed-up contracts are generally passed on to the contract management from the previous systems through an interface BAPI. However, during the life of the contract it can be expected that there will be direct access to the contract from transaction banking and data will be changed. Particular contracts such as, for example, contracts for CpD accounts are placed directly in account management. The contract recognises the freed-up and non-freed up state.

For all contractual data there can only be one "master" in an application landscape. This "master" is in account management for the handling data. Moreover, contracts are substantially managed automatically. That means that in this case the current state of the contract is known (e.g. after extensions). The contractual data are made available at interfaces.

As an explanation we should point out that there are of course contractual data which are managed in other applications and run as "master" (e.g. security identifications, authorisation of access). The central anchor for combining all the data is in the operational CRM.

Important processes in account management are: Investing, altering, extending, terminating, cancelling and dissolving contracts. These also affect the corresponding accounts. Two features of contracts are supported:

Account agreements

Card agreements (see below)

It will be understood that it is also possible to support other parties to the agreements.

Turnover Administration

The essential added value of account management lies in producing and handling movement data. The solution must be high performing and incur little cost. Other requirements of the solution are real time processing and availability 7×24 hours.

The turnover administration logs the individual turnovers in real time and controls a flexible updating of the account. The movements are monitored on the account. Individual transactions are payment entries (half sentences) which are based on the one hand on payment instructions and on the other hand on internal accounting (e.g. payment of interest). Additionally it is possible to calculate and process cash flows. Account management has an interface for receiving payment entries (BAPI).

Turnover administration does not recognise any open posting administration with corresponding balancing of individual posts. It is possible to monitor payments on the basis of the balance, which, for example, controls the input of funds in the course of a fixed money system or the payment of instalments in the case of credits.

Incoming payment entries are checked within the material arrangement for barriers and limits. A regulating mechanism (posting control rules) flexibly controls the reaction of the system by means of given parameters. Thus, for example, it is possible to determine, specifically for customer groups, whether a turnover is to be disposed of later or transmitted directly.

System reactions are:

Accounting, letter procurement, subsequent processing, return, refusal, CpD accounting.

The individual turnover is also the basis for the ledger handover. The data are also used for producing bank statements. The updating of transactions is clear of any currency and non-evaluated.

Orders or instructions describe the actions which the account management is to perform immediately or in the future. This means that instructions can be monitored in a watching file. These instructions may alter one or more objects.

Account management processes instructions. Examples are "dissolving contracts" and "setting limits". These instructions are initiated from outside through interfaces or internally by the application itself (e.g. watching deadlines for card renewals).

Other additional functions envisaged are central applications such as long term administration of instructions and payment orders (cf the preceding remarks).

The card solution uses these same components of product configurator, contract and financial conditions as the account management. Thus, the administration of cards is a specialisation of the general contract. It is necessary to integrate card administration into account management as there are close links between cards and accounts (e.g. EC card, debit card). In particular, SAP want to keep the option of handling credit card accounts in the medium term at the turnover end.

Card administration must constitute a solution which can optionally be used by the customer, i.e. card administration must be capable of being switched off within the account management. Moreover, the card administration should be capable of being dismantled in the medium term to such an extent that it can be used as an individual solution if there is a corresponding demand in the market. According to present experience, there is a need for an account management system including and excluding card administration. Hitherto there have not been any enquiries for card administration on its own.

Account management has a central administration for periodic work (e.g. processing at the end of the day). The bank gets maximum flexibility when planning the jobs. Covered under periodic working are the functions which have to be carried out repeatedly at a certain date. These include the closing down work of cash concentration, closure of accounts, interest compensation, bank statements, processing instructions, daily closure including updating the books and reporting. Before the closing work is carried out a cut off point is provided in the booking. After that, all bookings carry the next days date.

External systems for job control can also be tied in.

The Posting Lock Manager (lock administration) is responsible for temporary accounting locks, i.e. he imposes barriers which are initiated by business events (posting lock events) and releases these barriers after the event in question has passed. Barriers which are defined a priori on the product are not included in this component.

Figure 3:
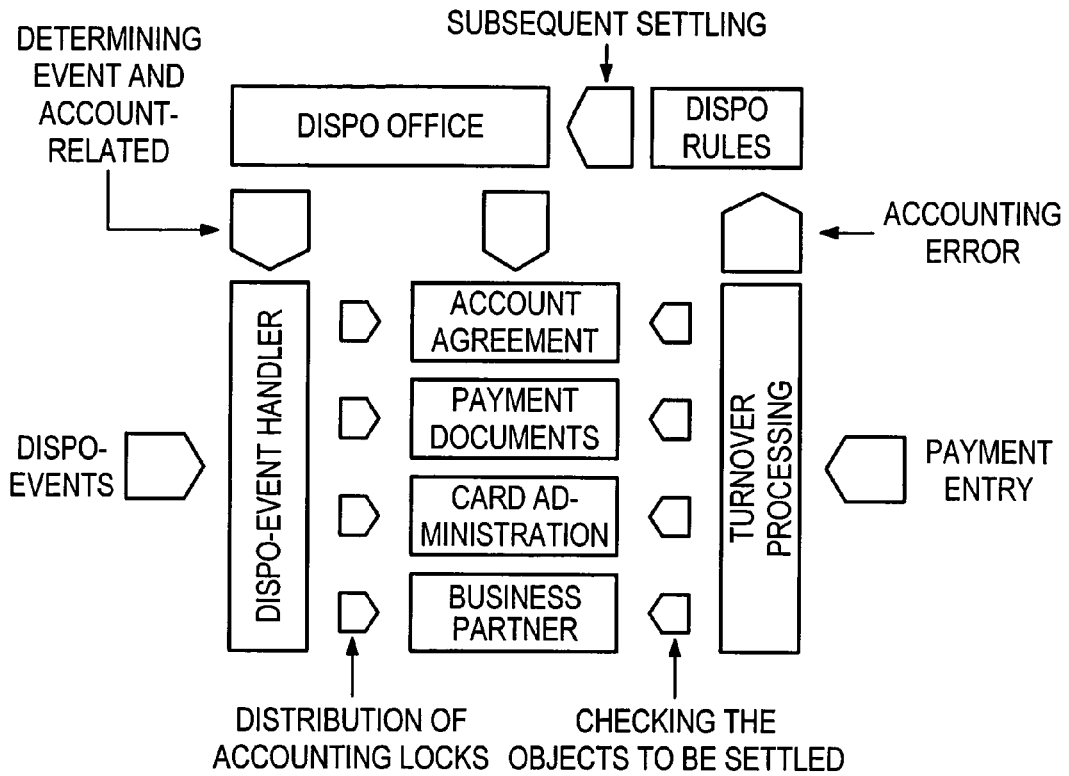
FIG. 3 is a block diagram showing the interplay between the components according to the invention within the turnover processing (where DispoOffice denotes Posting Control Office, DispoRules denotes Posting Control Rules, DispoEvents denotes Posting Control Events or Posting Locks and DispoEvent Handler denotes Posting Lock Manager).
Figure 4:
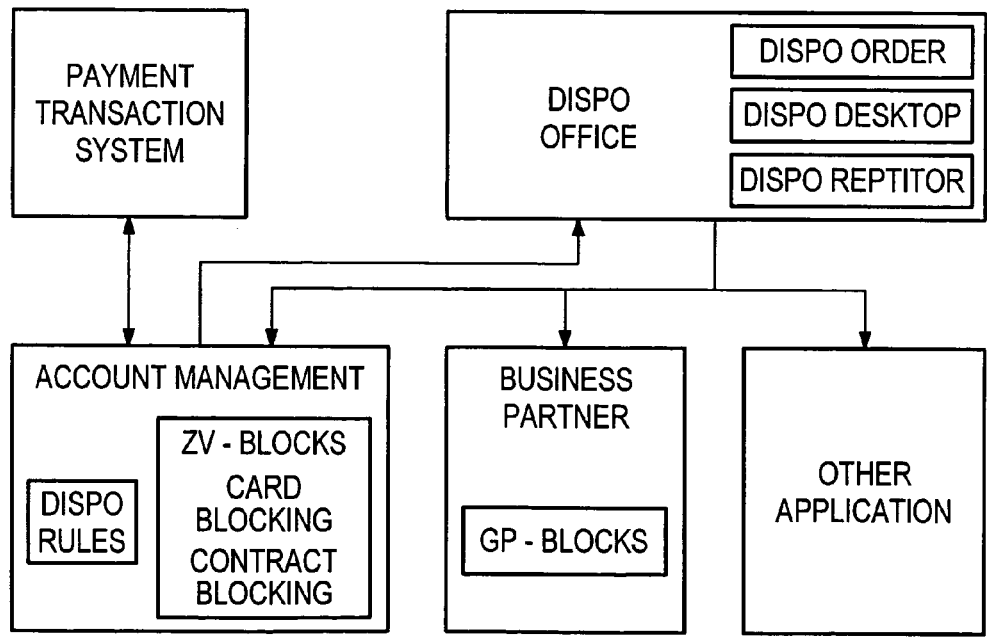
FIG. 4 is a block diagram showing the structure of the Posting Lock Office according to the invention.

FIG. 3 shows a block diagram to illustrate the interplay within the turnover processing with the participation of the so called Posting Lock Manager and FIG. 4 is a block diagram illustrating the structure of the so called posting control office.

The Posting Lock Manager accepts posting control locks from various input channels (back office, call centre or switching systems and credit reference agencies) and determines the reaction of the system, according to the rules. The solution runs largely without any manual intervention in operation (receipt and processing of events). In account management, possible manifestations of blocking processes are contract blocking (the contract as a whole and the blocking of partial functions), the blocking of cards in the portfolio as well as cheques and other printed payment means. At the business partner the central business partner lock can be imposed, extending across all the accounts held by the customer.

If for example a business partner notifies an arrangement, the Posting Lock Manager distributes suitable barriers. Thus, this rule may for example prevent overdrawing and debits on all accounts and may block all the cards for the business partner in question. This regulating mechanism can be extended in customer-specific manner.

As a result of the primary function of account management, of managing the legal position, flexible reporting is available. This includes numerous lists such as for example lists of overdrawings, balances and transactions. It is also possible to draw up lists for blocked accounts and cheques and reconciled balance lists for comparing the payment transaction balances.

The definition of other reports is flexibly possible.

Accessory applications to account management from the point of view of the application landscape are:
  Posting Control Office
  Dynamic limit setting
  Warnings/interest on overdrafts As mentioned hereinbefore, accessory applications add to or support the function or task of one or more core applications.

The Posting Control Office is an additional application to account management which serves to provide payment entries in which a lock or unauthorised overdrawing has been detected in the accounting.

Payment entries which come up against booking obstacles (locks) in account management and accounts in which there is an unauthorised overdraft are disposed of according to a regulating mechanism (posting control rules). This regulating mechanism which can be adjusted in client specific manner is administered in account management. If desired, information on payment entries which are not explicitly rejected in response to the posting control rules are diverted to the posting control office by means of a disposal order (Posting Control Order), where they are further processed (settled) either mechanically or manually. Mechanical settlement (repetitor) comprises automatic resubmission of payment entries for accounting to account management. Payment entries for which there are only temporary booking obstacles (e.g. limit problems) can be settled without any manual intervention by means of the repetitor.

The duration and frequency of resubmission and the final reaction (e.g. rejection) in the case of unresolved or fresh obstacles to booking can be adjusted.

The manual processing of payment entries which are to be settled is carried out at the posting control desktop. In this partial solution the role-based set up and usability are of central importance. The disposing manager is assisted in his decision by access to data relevant to the decision, either to finally deal with the payment entry (book or reject actions etc) or pass them on for mechanical settlement.

Dynamic limit setting is a solution which is required particularly in automated mass business. This is an accessory application to account management which allows the individual bank to set automatic limits for the customer on the basis of defined rules and input parameters.

Dynamic limit setting is programmed by the customer or in customer projects to suit individual requirements. The limit setting communicates with the stock control, the business partner and the operational CRM.

This accessory application is responsible for out-of-court warning processes.

Figure 5:
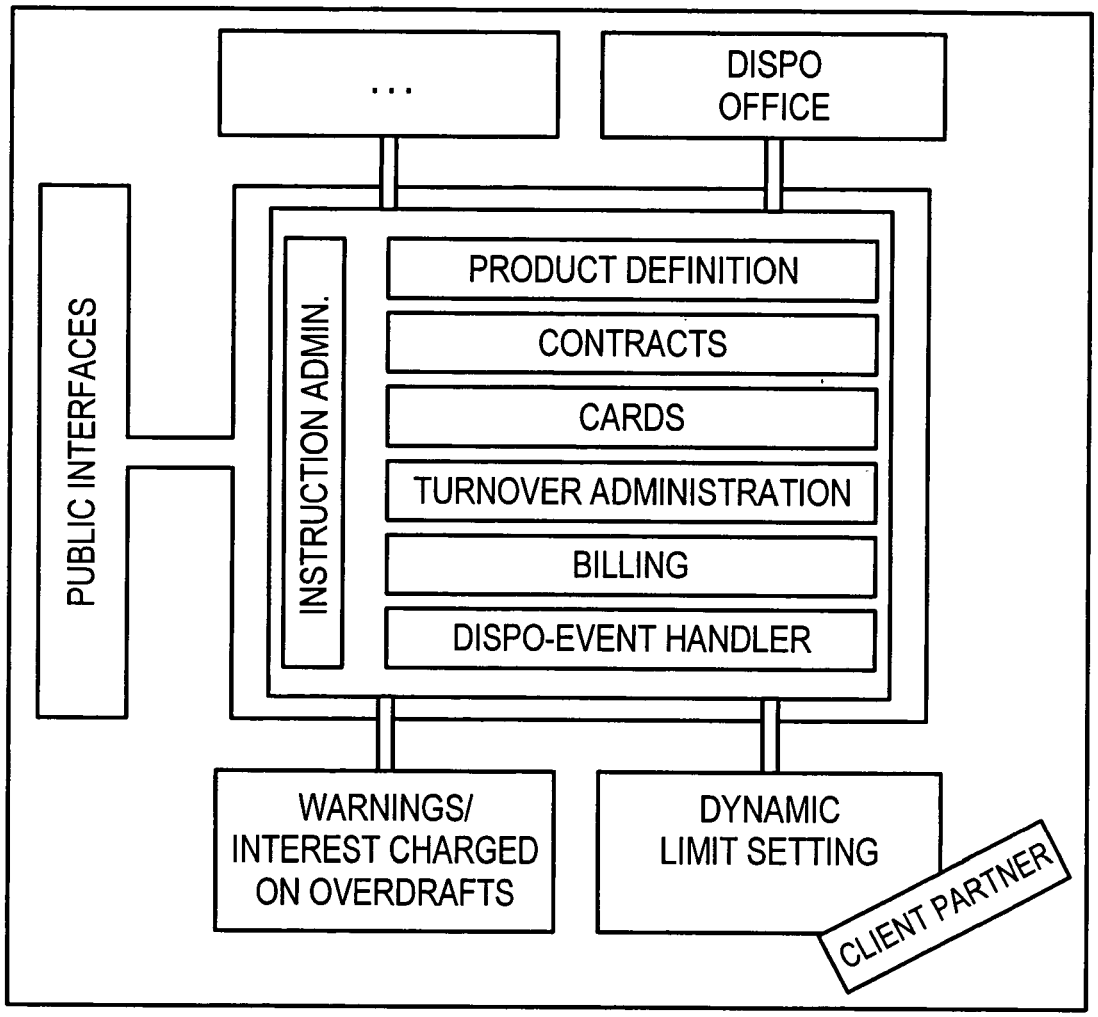
FIG. 5 is a block diagram showing an overview of the structure of the core application account management.
Figure 6:
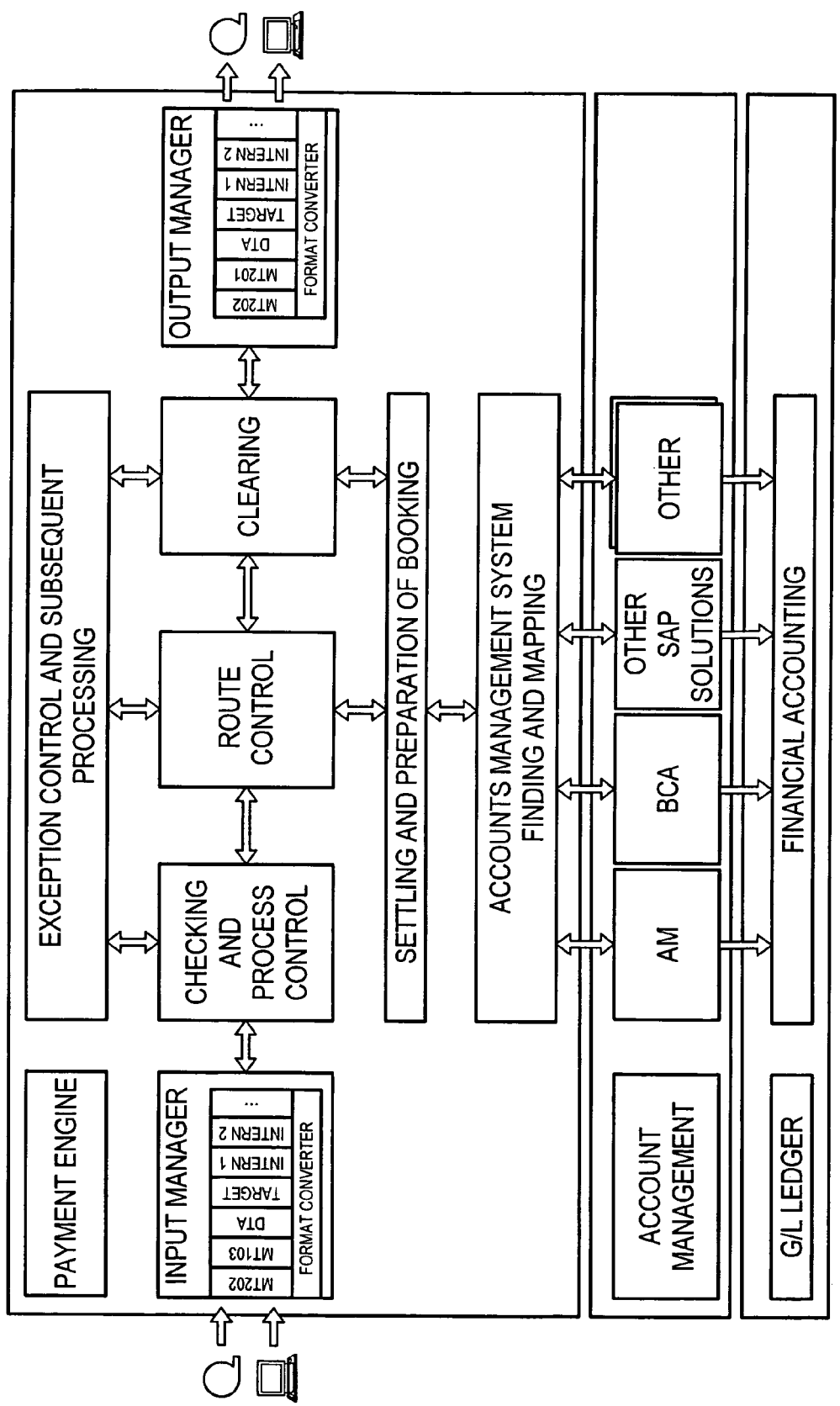
FIG. 6 is a block diagram showing the embedding of the invention in a system environment.
Figure 7:
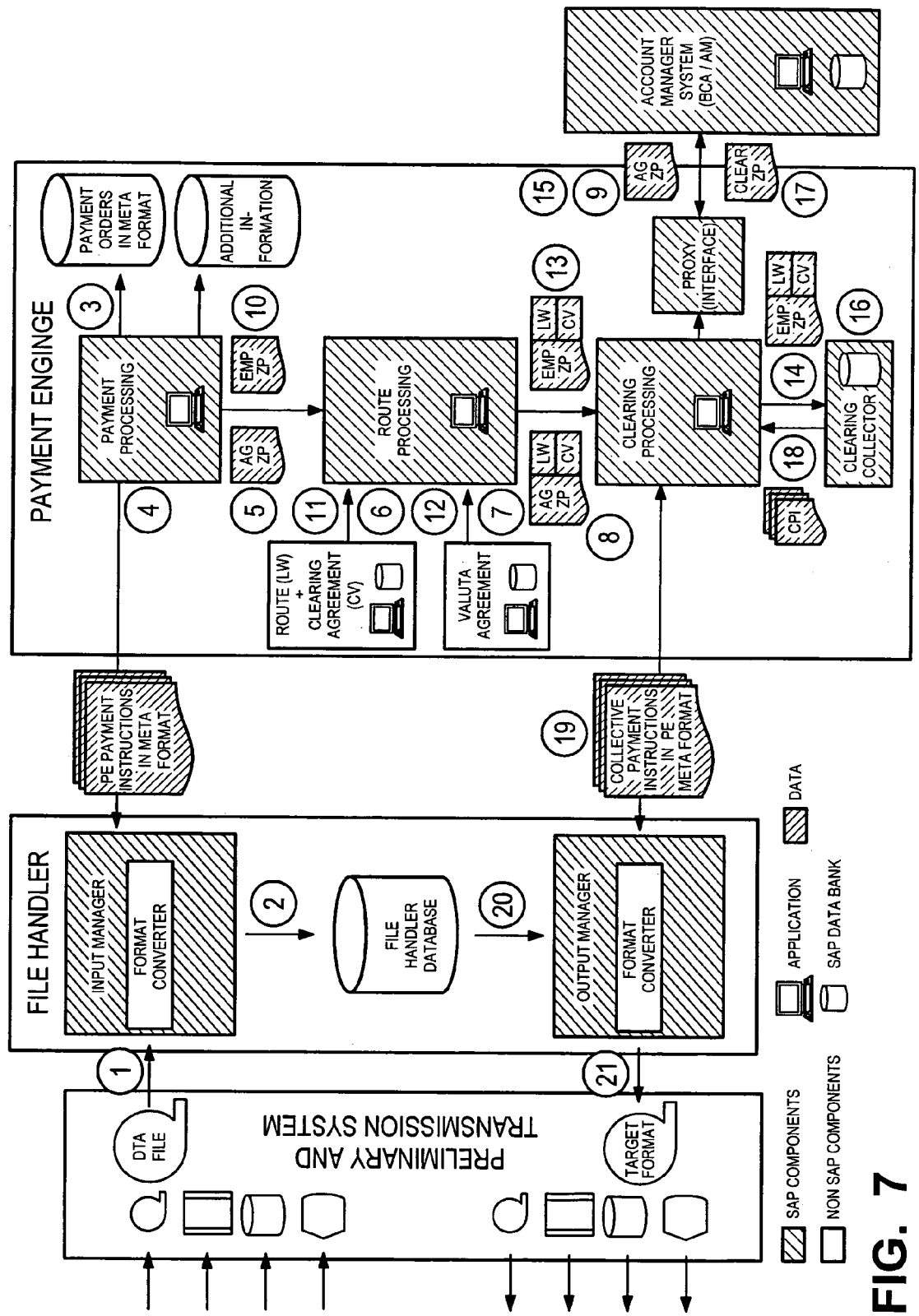
FIG. 7 illustrates the invention by the example of a process for dealing with a DTA file.
Figure 8:
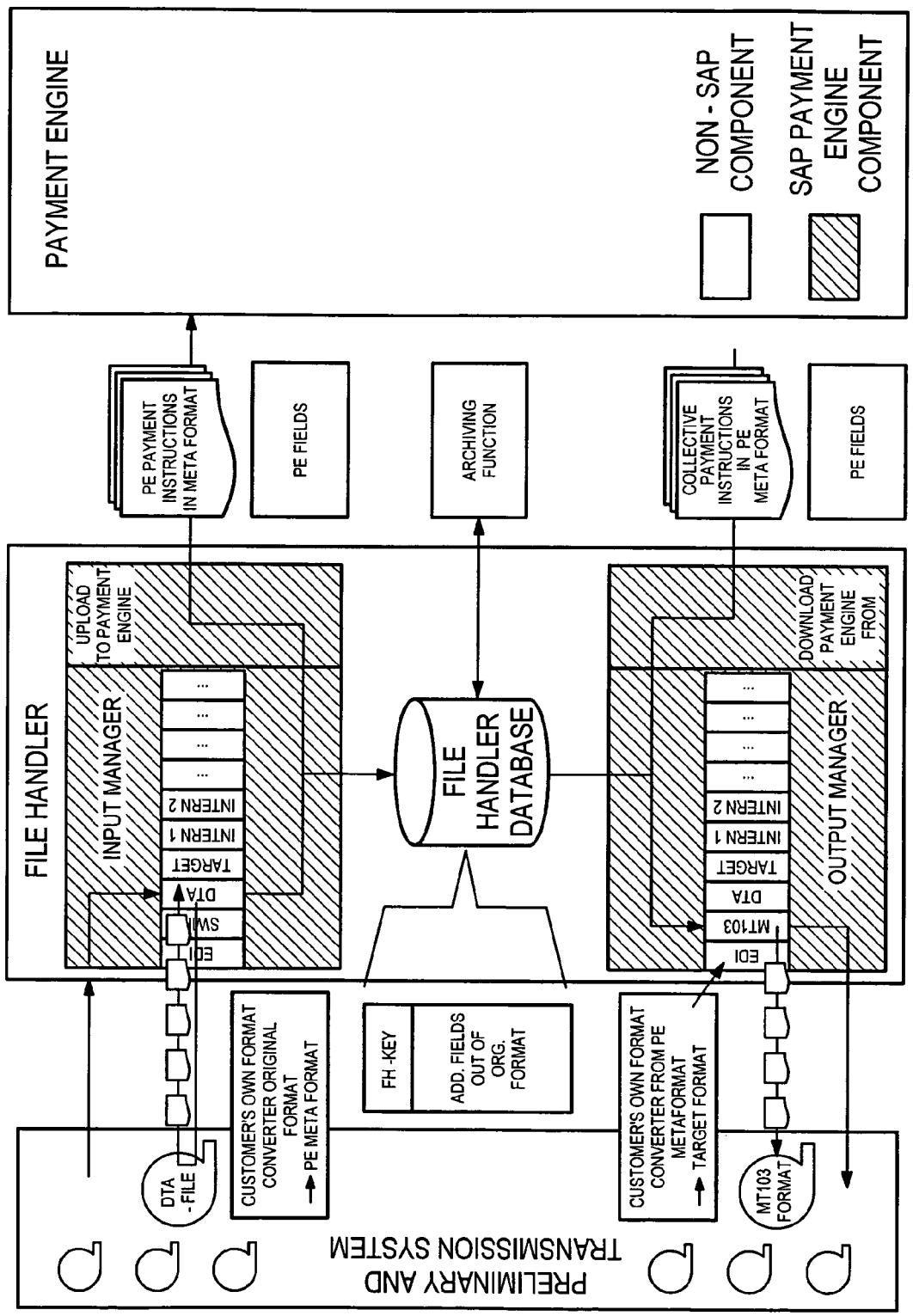
FIG. 8 shows a dataflow diagram using batch processing as an example.
Figure 9:
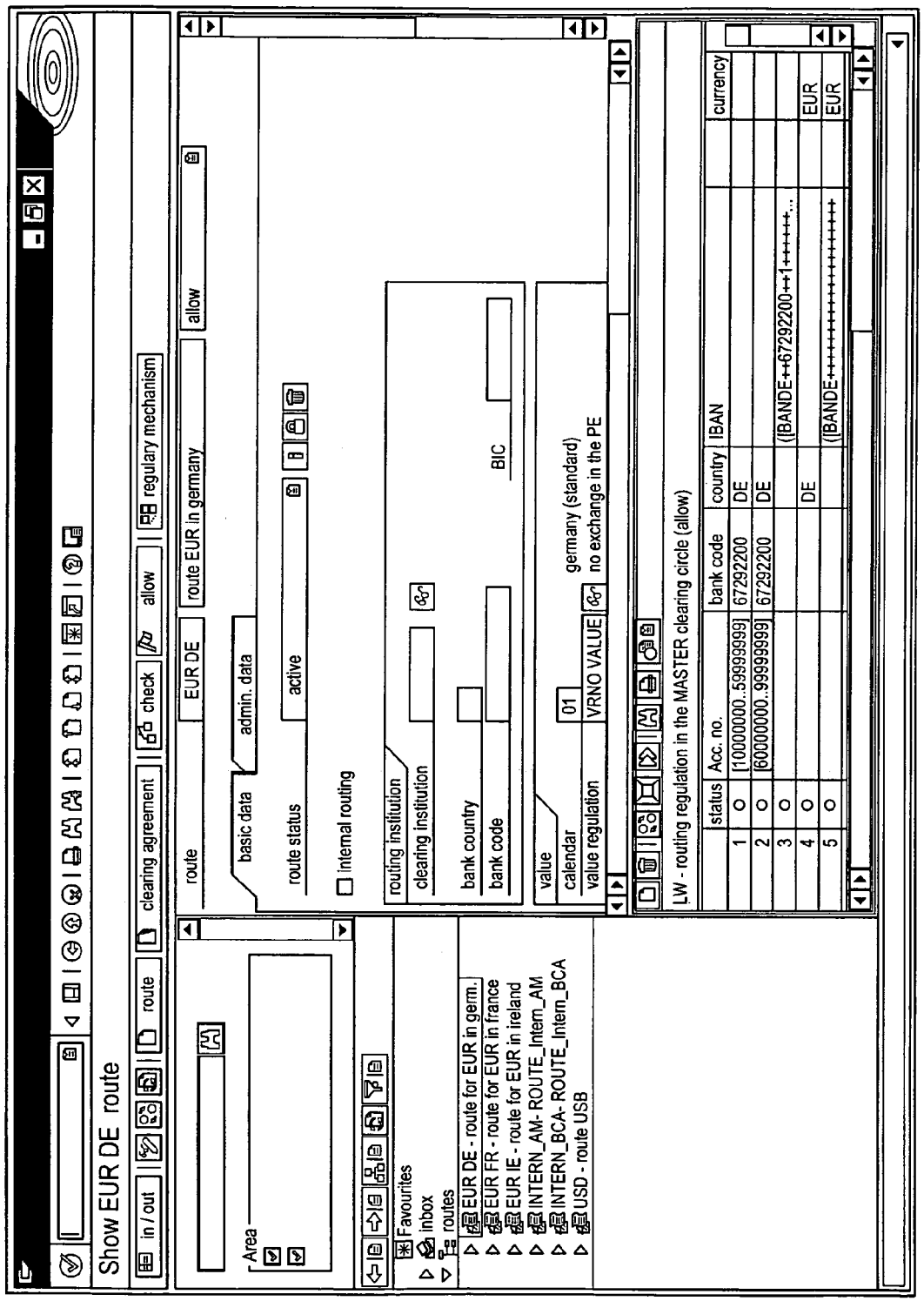
FIG. 9 shows a screen shot for the routing management in the payment engine in the basic data field.
Figure 10:
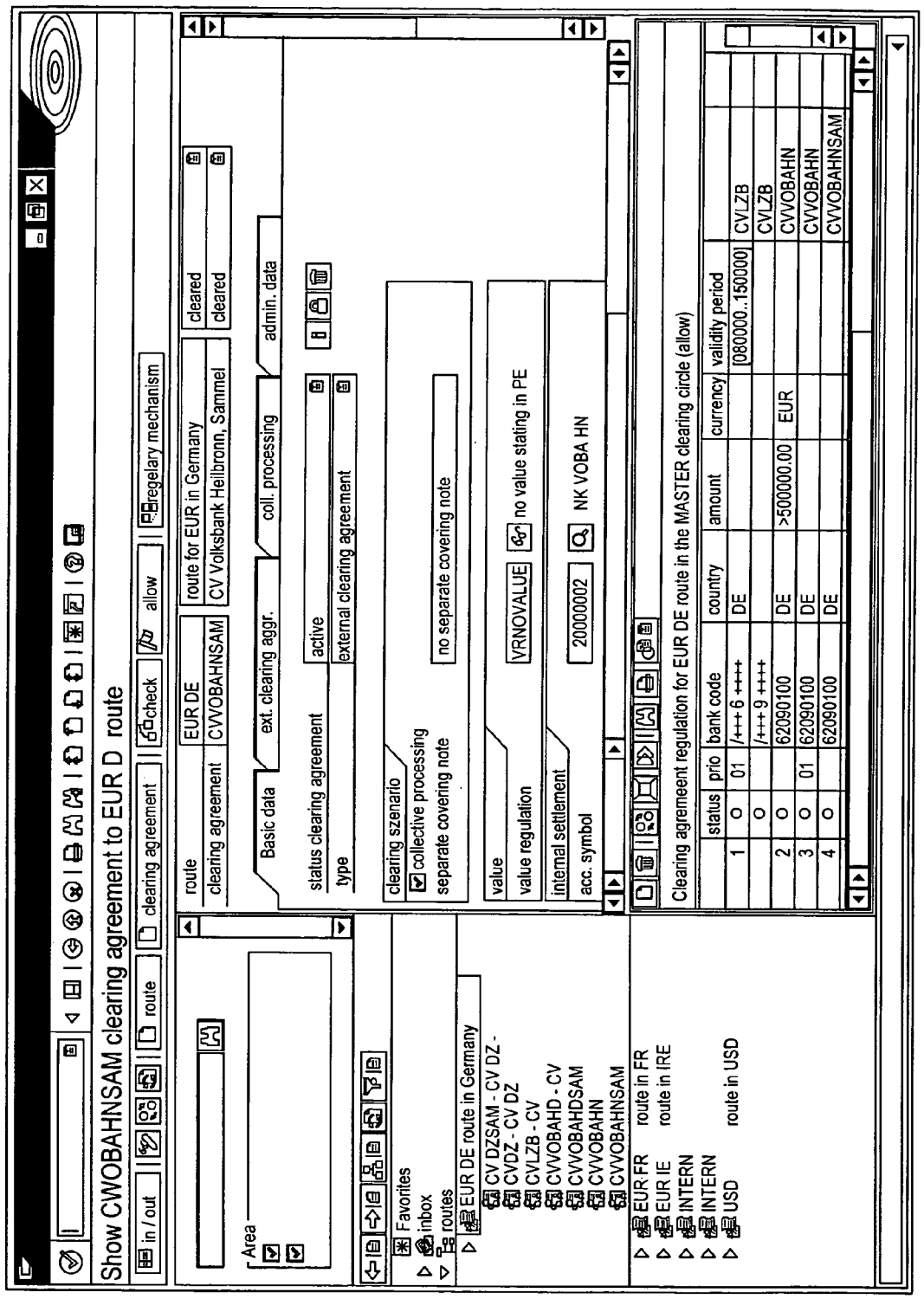
FIG. 10 shows a screen shot for the clearing consent management in the payment engine in the basic data field.
Figure 11:
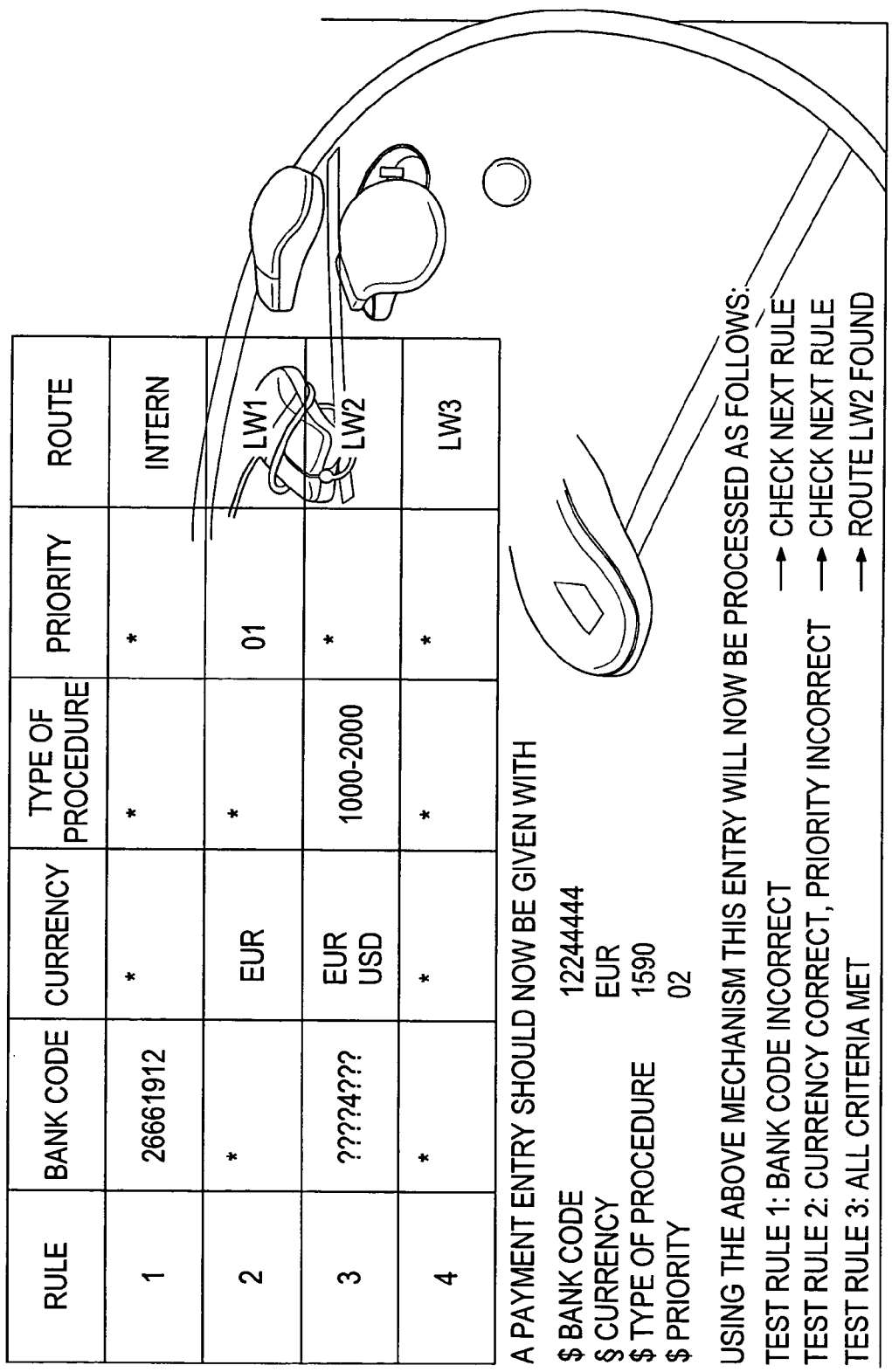
FIG. 11 shows a simplified example of route finding.
Figure 12:
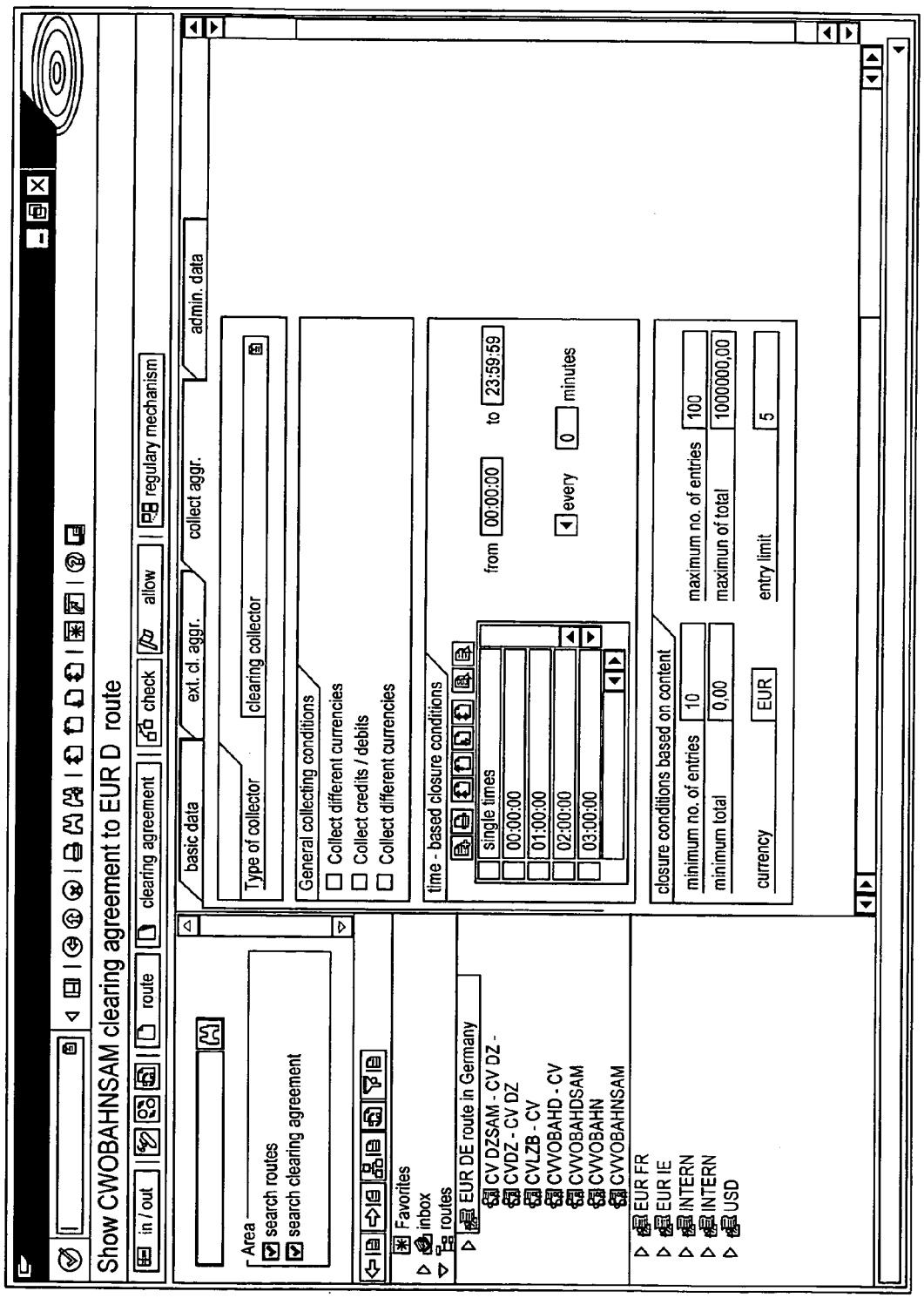
FIG. 12 shows a screen shot for the clearing consent management in the payment engine in the collective processing field.
Figure 13:
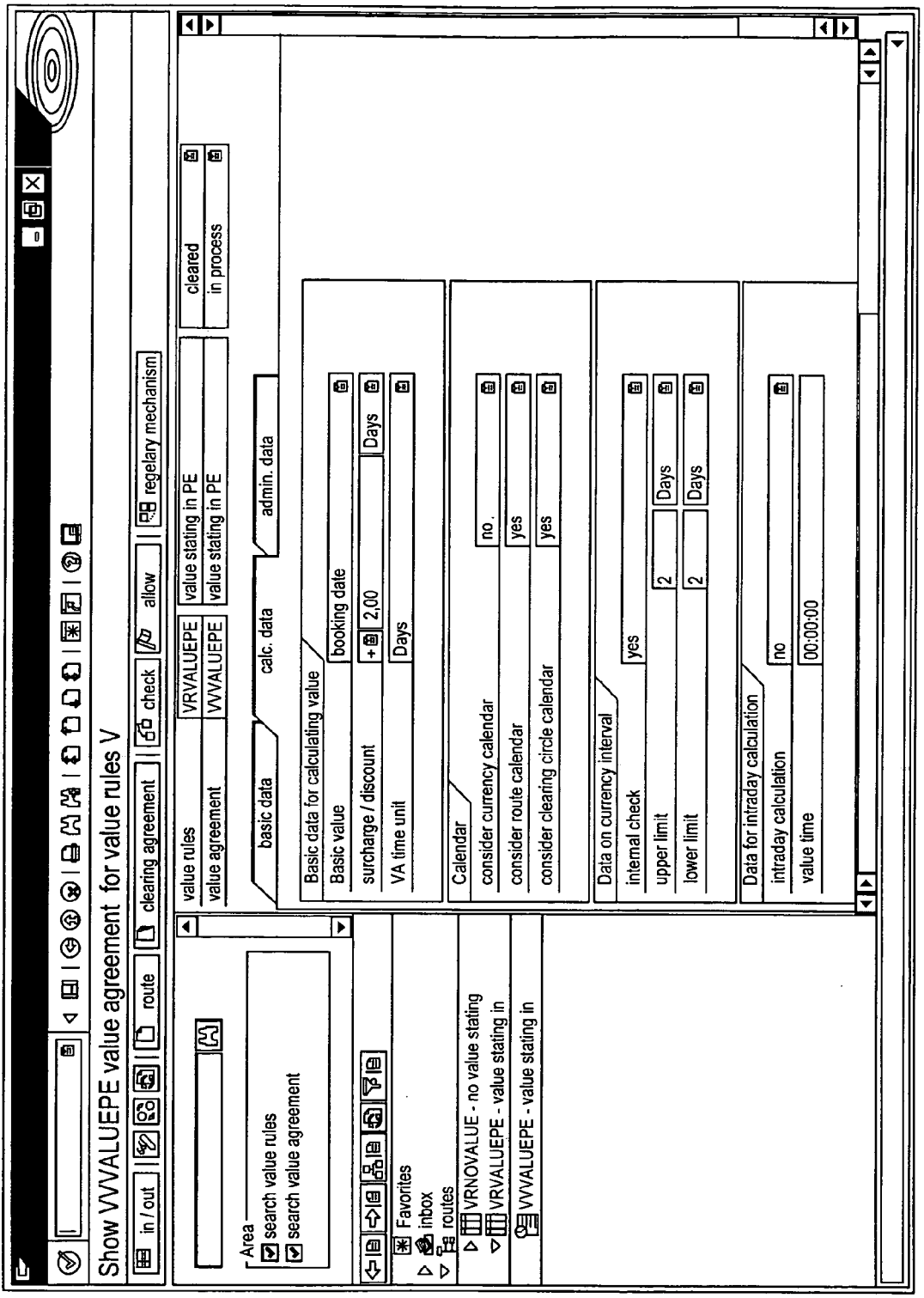
FIG. 13 shows a screen shot for managing the currency agreement in the payment engine in the calculation data field.
Figure 15:
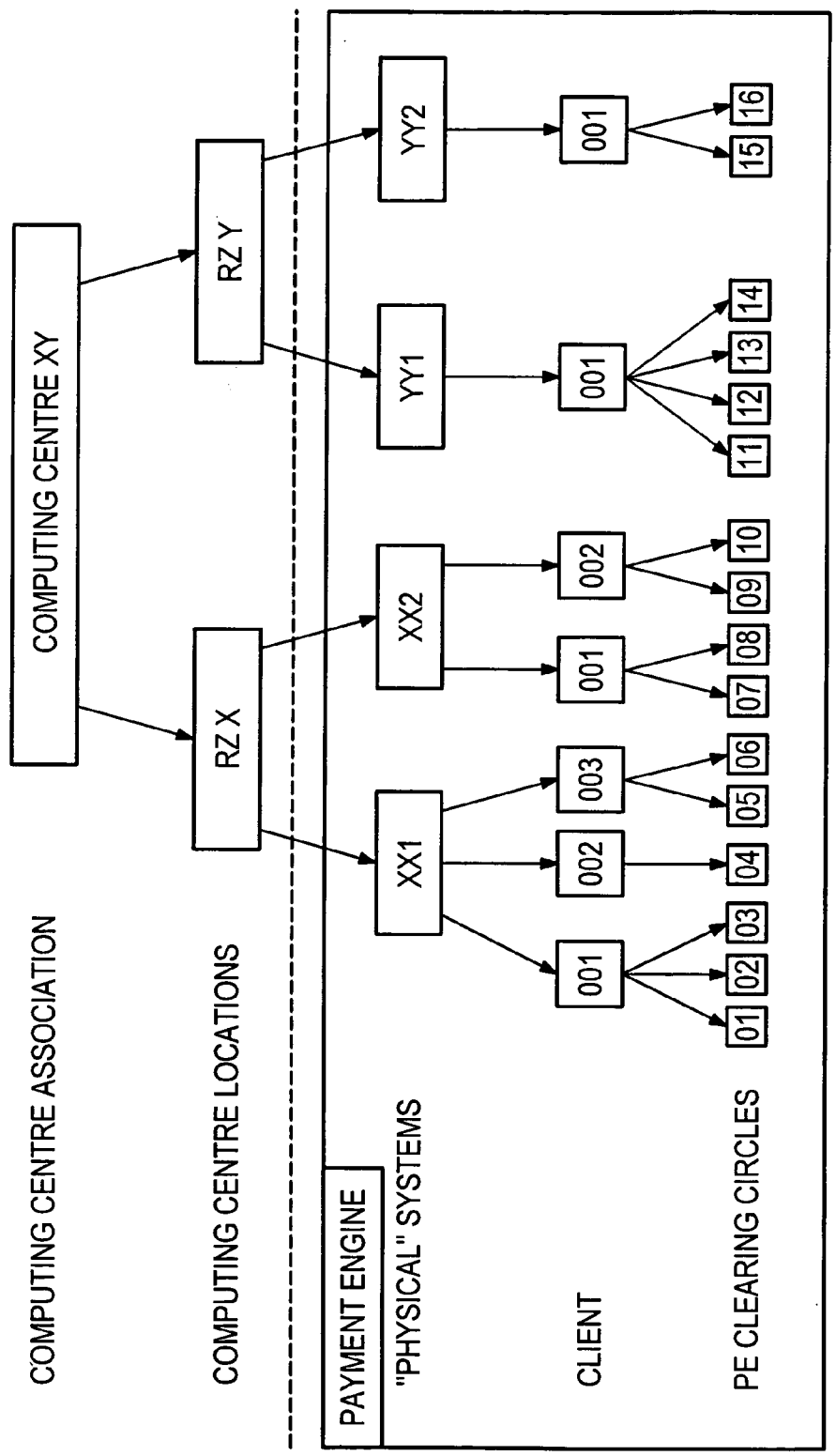
FIG. 15 is a diagrammatic view of a first example of a computing centre combination according to the invention.
Figure 16:
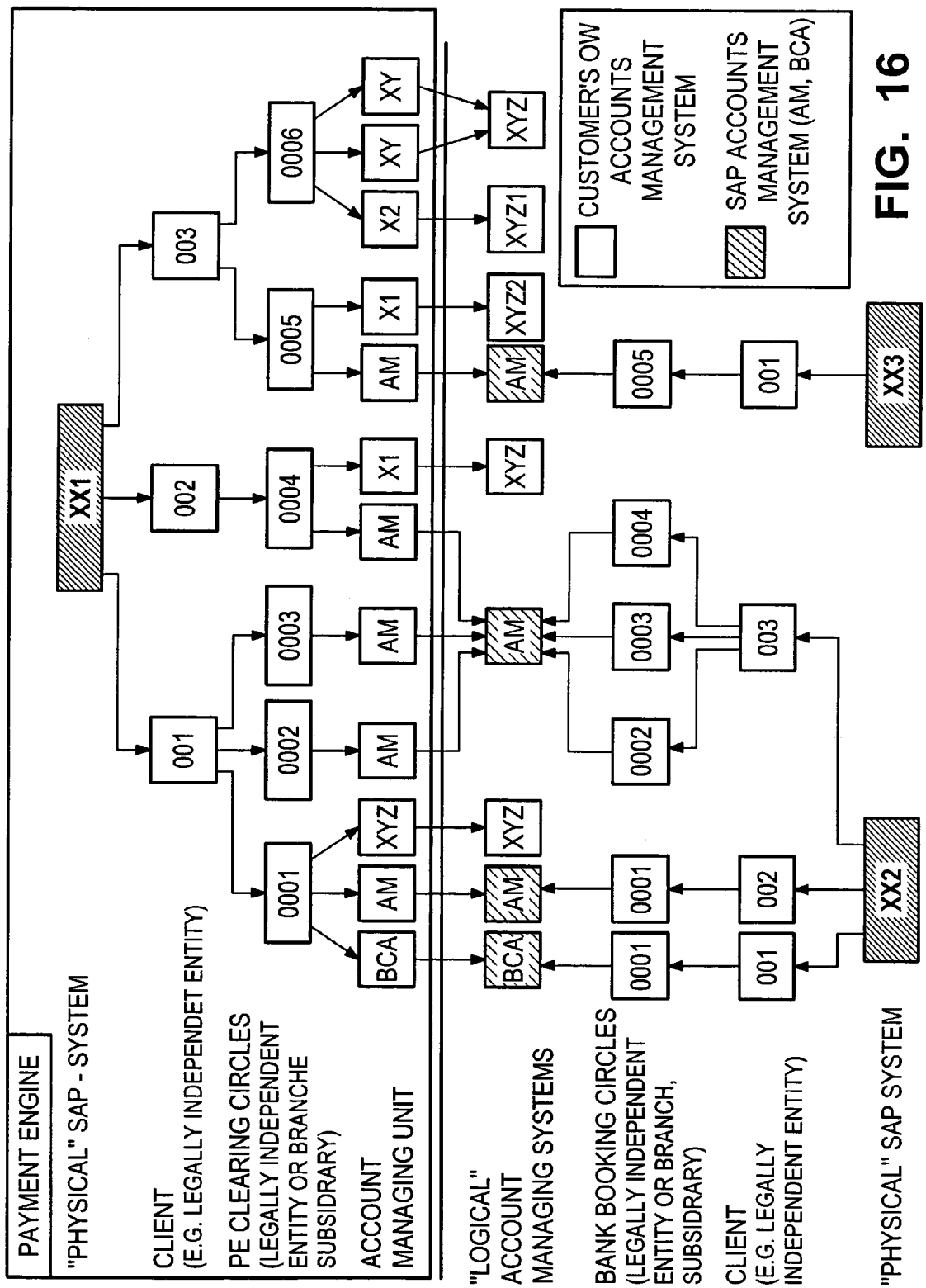
FIG. 16 is a diagrammatic view of a second example of a computing centre arrangement according to the invention.
Figure 17:
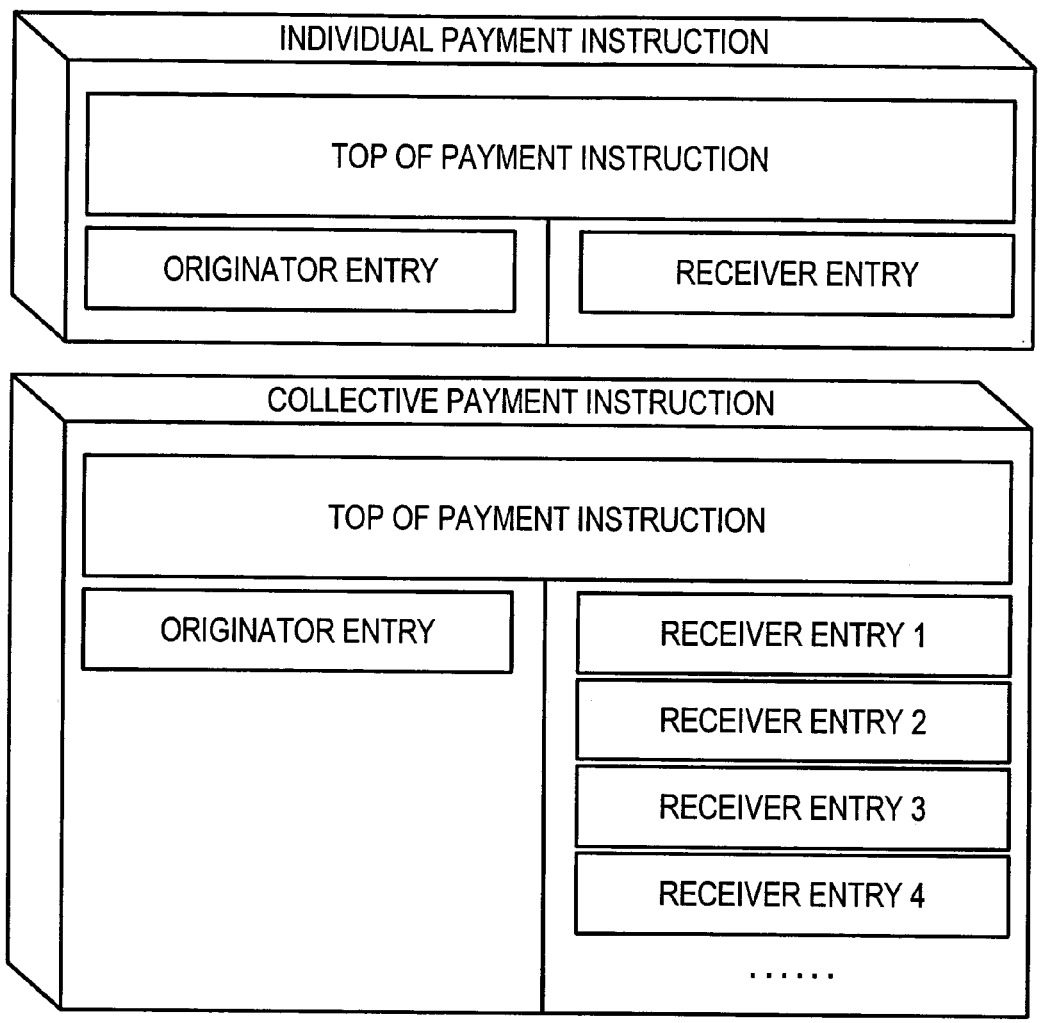
FIG. 17 diagrammatically shows a payment instruction in the payment engine.

FIG. 5 is a block diagram providing a summarising overview of the structure of the core application account management.

The invention will now be described in more detail with reference to FIGS. 6 to 16.

Within the scope of ever-changing payment transactions banks and financial services have to rethink their strategies and concepts. Against the general background of increasing competition, globalisation of the markets combined with the use of cost lowering potentials the target must be to achieve an efficient and cost saving infrastructure for mass payment business in which STP (Straight Through Processing) capability must be given prominence.

Measured by current demands the payment transaction systems of the banks which have grown up historically have proved too inflexible as they can only be maintained and expanded at unreasonably high cost.

The present invention is a contribution to improving payment transactions within banks and financial service providers.

As a component of SAP core banking the payment engine according to the invention controls the operational real time handling of payment instructions. As an independent payment transaction component for handling mass data it forms the central component between external clearing and internal accounting systems. The payment engine thus expands SAP core banking into an integrated high performance total solution.

The two SAP account management systems mySAP banking accounting management (FSAM) and mySAP banking bank customer account (FSBCA) are directly linked. However, the open system architecture of the payment engine makes it possible to add on other account management systems. It is envisaged to produce other integration scenarios depending on the requirements of the system user and their priorities. The payment engine provides functions for finding an account management system and distributing payment entries between different systems.

Against the background of the rules on cross-boundary payments in EUROs of the EU commission and the use of cost lowering potential, the payment engine supports the maintenance of the STP criteria (such as for example the use of IBAN and BIC).

The payment engine is characterised by a generic architecture with the goal of autarchic usability of the payment engine in payment transactions by banks, in-house cash centres and businesses. Supplements for individual customers can be obtained based on BTEs (Business Transaction Events) and BADIs (Business Add-Ins). It provides well defined interfaces for upstream and downstream systems using standard technology such as BAPIs (Business Application Programming Interfaces).

In foreign payment business there are requirements imposed on reporting. The requirements on reporting functions are country-specific and therefore not included in the payment engine. It is therefore assumed that a customer has his own reporting component in use. The payment engine can provide an interface for integrating the reporting data. It is presumed that the incoming payment instructions contain the relevant reporting data.

In banking there are various requirements imposed in liquidity management. The customers own liquidity management system for controlling liquidity can be supplied, through an interface, with the accounting-relevant information from the payment engine.

The processing of the incoming bank statement and the reconciling of nostro accounts is not dealt with within the payment engine. The nostro reconciliation system belonging to the client can be supplied with accounting-relevant information through an interface.

Traditionally, payment entries and withdrawals have been dealt with in business using so called batches. According to the invention a payment handling device or payment engine is provided which automatically recognises the payment destination (in the sense of the target account and method of transfer).

The payment engine makes it possible to link both batches and online methods, particularly by assisting straight through processing.

When a bank receives a payment entry the payment engine determines the target account, i.e. whether the account is within the same bank or outside it.

Conventionally, in target accounts, distinction is made between the home country and abroad and a distinction is drawn between different networks for bank addressing, leading to a rigid and inflexible system. The invention, by contrast, provides a control unit by means of which it is possible to reduce the hardware and processing work done by operating personnel.

In the system landscape clearing circles are run as further settings for clients/customers. For each clearing circle there may be one or more account-managing units, and it is possible to tie in to a logical account management system (an account managing unit). By clearing is meant the final accounting and the exchange of payment instructions between credit institutions. The clearing scenarios describe the aspects of how payment instructions are exchanged and the equivalent amount is calculated. Account management system finding relates to information, and these rules can be combined by logical connections for example for exceptions. Then the posting or entry is passed on to the account management, the receiving system processes the booking in full. The payment engine thus constitutes a pure process control without any accounting knowledge, which means that there is less redundant data. It also provides a central currency conversion.

Data which are not relevant to the process are separated off previously in the input manager and are given a reference number. Later they are added on again in the output manager. Research is made easier by the depositing of pointers in the payment engine. According to the invention the booking data is uncoupled from the processing data. The route can be influenced interactively by the so called cash manager. A process limit (debit limit, authorisation limit, cash authorisation limit), for example per time limit, can be set up in the booking system and used by the payment engine. Process limits can be accumulated against one another.

A large payment instruction (cumulative instruction) can be broken up and passes officially through a main bank. The individual instructions resulting from the break up can then be passed on directly. This can also be used to handle transactions which are not accepted directly (as is the case with debits, for example).

The payment engine architecture is made up of the following three components according to the invention:
  Payment Processing
  Route Processing
  Clearing Processing
  In addition, as an input or output component to the payment engine, a file handler (instruction processor) is provided. The file handler is made up of
  Input Manager (Input processor)
  Output Manager (Output processor)

Description of Process (cf. FIG. 7):

1. The preliminary system (e.g. file management) receives a new instruction as a file (in the embodiment shown in FIG. 7 the DTA format) and calls up the input manager—with information on this file (channel, medium, format and pathway). Using this channel, the medium and the format, the input manager recognises the correct format converter peculiar to the customer. The format converter reads the file and maps the input format onto the payment engine metaformat. In addition, all format-dependent checks and necessary derivations are carried out in the format converter.

2. After checking and mapping in the format converter specific to the customer the input manager takes the data. All the fields in the original payment instructions or payment entry which are not needed for processing in the payment engine can be deposited in the file handler databank. Thus, all the original data are again available to the output manager if payment entries of the incoming payment instructions are placed in an outgoing payment instruction after processing.

3. The input manager hands over the payment instruction data in the PE metaformat for storage to the payment processing component. The metaformat contains payment instructions including payment entries and data specific to intended use, reporting data and customer-specific (additional) fee information.

4. In payment processing the payment instruction including payment entries is formally checked.

5. The originator entry is first handed over from the payment processing component to the route processing component in order to find the route and clearing agreement.

6. In route processing the route (LW) and the associated clearing agreement (CV) are obtained.

7. The currency agreement for the originator entry is also determined in route processing.

8. The originator entry supplemented with the route LW and clearing agreement CV is passed on to the clearing processing component. In clearing processing a decision is made, using the route and the clearing agreement information, as to how the originator entry is to be further processed.

Using the route and the associated clearing agreement it is determined that the originator entry is to be booked into the account management system within the institution. (Note: with regard to the originator entry it should be noted that this is always internal).

9. Through a proxy the originator entry is passed on to the account management system for settlement and reservation of booking. Whether a settlement and reservation or a booking is carried out depends on the functionality offered in the account management system. From the account management system comes a corresponding reply as to whether the originator entry has been successfully booked.

10. After successful settlement/reservation or booking of the originator entry the individual receiver entries are passed on to the route processing component.

11. In route processing the route LW and the associated clearing agreement CV are determined.

12. Also in route processing the currency agreement is determined for the receiver entry.

13. The receiver entry, supplemented with the route LW and clearing agreement CV, is passed on to the clearing processing component. In clearing processing a decision is made by means of the route LW and clearing agreement information CV, as to how the receiver entry is to be further processed.

14. Using the route and the clearing agreement, in this embodiment, it is decided that the receiver entry is external to the institution and should be placed in a clearing collector. The receiver entry is therefore placed in an open clearing collector.

Steps 10 to 14 are repeated for each receiver entry.

15. The reservation of the originator entry in the accounts which may take place in Step 9 is resolved by a booking after all the receiver entries have successfully been dealt with. Thus the incoming payment instruction is processed in the payment engine.

16. In the clearing agreement the closing criteria for the clearing collector are recorded (e.g. the number of entries and total entries). They are constantly checked by an independent process initiated by the primary processing operation and updated. In addition a check is made to see whether the collector has to be closed because a given time has been reached. The clearing collector is closed when a closing criterion comes into effect.

17. When the clearing collector is closed a clearing entry (collector total) is drawn up and this is associated with the accumulative payment instructions passed on. The clearing entry is transmitted through an interface to the relevant accounts management system. Immediate feedback is obtained from the accounts management system (e.g. booked, not booked, declined).

18. Then an accumulative payment instruction with all the payment entries of the clearing collector as the receiver entry and a new originator entry is drawn up. The outgoing cumulative payment instruction is passed to the output manager from the clearing processing.

19. The information from the outgoing cumulative payment instruction in the payment engine metaformat is passed on to the output manager. The output manager reads the cumulative payment instructions submitted in metaformat in batches, in the case of large payment instructions, and provides a status report after the final batch ("outgoing payment instructions accepted").

20. By means of the channel, medium and target format, the file handler recognises the correct format converter specific to the customer. The format converter maps the outgoing metaformat to the target format. All fields or information from the original payment instructions are theoretically available for mapping (some of them are read out of the file handler databank by the file handler or are derived from the outgoing payment instructions in metaformat and made available to the format converter; see Point 2). In addition, in the format converter, any format-dependent checks are carried out on the outgoing payment instructions.

21. The format converter specific to the customer transmits the payment instructions drawn up in the target format to the corresponding transmission systems.

File Handler—Input Manager

As there are a very large number of different formats, some of them specific to their country, in worldwide payment transactions, the input manager has to have a format converter specific to the customer. The format-dependent part does not belong to the SAP standard and its implementation or response is with the customer or SAP implementation partner in question. This is intended to ensure that the payment engine is independent of format. Moreover, this procedure guarantees that customer-specific or internal payment instruction formats can be implemented.

However, a standard framework is made available in which the customer can incorporate his particular format conversion routines within the scope of an insertion project. The format-independent part belongs to the SAP standard and comprises databank handling and also the transmission of data to the payment engine.

In the file handler the customers own format-dependent part including format converter is identified by the parameters channel, medium and format. In the case of the Input Manager the customers own format converter reads the external data, converts them into the payment engine metaformat and then passes the data on to the format independent part of the input manager which ensures further processing. This further processing comprises depositing data which cannot be stored directly in metaformat in the file handler databank and transmitting the data in metaformat to the payment engine itself. This means: all the fields in the original payment instructions or payment entry which are not needed for processing in the payment engine can be deposited in the file handler databank. The input manager transmits the payment instructions and associated payment entries to the payment engine.

Payment Processing

Payment processing generally deals with the administration of payment instructions and payment entries including the necessary status administration. The input manager breaks down the information in an incoming payment instruction into the components of the metaformat:

Data for further processing (actual payment instructions including payment entries)
Additional information:
  Data as to intended use
  Reporting information
  Customer specific (additional) fee information: If the customer has their own fee determining or management system in use there is the possibility of depositing this fee information at the payment entry in order to use it for later evaluation purposes.

Only the actual payment instructions are used in payment processing. The additional information is deposited in a databank and reference is made to it in the payment instructions or payment entry.

Also the corresponding formal checks for payment instructions and payment entries are carried out here. In addition the consistency of all the payment entries of a payment instruction is ensured. At this point we should mention by way of example the checking or reconciliation of debits and credits. If the originator entry is formally wrong, the receiver entries are not further processed and the entire payment instruction is passed on for further processing. Moreover, the customer is able to define and implement additional checking objects which can be integrated in the formal checks of the originator entry. All material checks (such as for example checking the account limit or checking the admissibility of a particular procedure) take place in the account management system and thus depend on the functionality provided here.

Route Processing

In route processing for each payment entry

A route and an associated clearing agreement are obtained.

Using a regulating mechanism, in a first step, a clear route is established for each payment entry. For the regulating mechanism (for establishing the route) there is a flexible selection of attributes available. Technically, all the fields of the payment instruction of payment entry from the metaformat definition can be used as attributes. In addition, features are prepared with which the validity of a rule can be limited in time (e.g. date, time, day of the week, first or last of the month). The customer can also integrate fields specific to himself.

In the clearing agreement the terms for passing on payment instructions between the financial institutions are set down. These include, inter alia:

whether payment entries are passed on individually or in batches, how the payment information is exchanged (directly or indirectly)

how the equivalent value is obtained, in which account the accounting takes place.

The rules for finding the clearing agreement may be made flexible analogous to determining the route. Routing and clearing agreement depend on one another so that first of all the rote is determined and then the clearing agreement is found.

In addition, the payment engine provides functionalities for value finding. The aim of value finding is to associate values to those payment entries for which this is desired. The valuing may depend on various parameters such as for example the procedure used, the amount and the currency. The actual procedure for calculating a value for a payment entry is laid down in so called value agreements. The value agreement contains the following information, inter alia:

Need for value

Fixed value acceptance

Basic value, mark up/part payment

Value interval

Value split code

The finding of the value agreement may also be flexibly designed.

Moreover there is the possibility of carrying out a value split for originator entries. The value split means that different originator entries are drawn up from one collective payment instruction depending on the valuing of the receiver entries.

Clearing Processing

In Clearing Processing the individual payment entries are further processed.

According to the information supplied by route processing (route and clearing agreement) and the features of the payment entries to be booked, either an individual booking is made within the institution in the accounts management (e.g. SAP account management) or a collector is established. In the case of individual bookings for an external institution (e.g. urgent instructions) the payment entry in a new outgoing payment instruction is passed directly to the output manager. If the payment entries are to be collected according to the clearing agreement a clearing collector is opened up and the payment entries are placed there.

When a collector is established, if there is no open collector available, a collector is set up and the payment entry is first placed therein. When the collector is closed, an accumulated payment instruction (including new originator entries) and a clearing entry are generated from the collected payment entries in the collector. Payment entries refer to the corresponding collector and this ensures documentation without any gaps. Collectors may be closed automatically (on the basis of the closing criteria laid down in the clearing agreement) or manually. The following automatic collector closing criteria exist:

Reaching the prescribed maximum collector total,

Reaching the prescribed maximum number of entries,

Reaching a given time combined with a minimum sum and a minimum number of entries in the collector (the conditions are connected by "AND").

After the collector has been closed the clearing entry (sum of all the individual entries) is transferred to the account management system for booking.

The collective payment instruction produced is passed on to the output manager.

Further processing depends in turn on the particular clearing scenario which will be described hereinafter.

File Handler—Output Manager

The customers own format converter in the output manager establishes the specific format of the outgoing payment instruction on the basis of the outgoing payment instruction delivered by the payment engine and the additional original data from the file handler databank.

The payment engine can cover the performance requirements of the major computing centres and private banks by parallel processing.

With the definition of organisation units, for example a number of legally independent financial institutions and the possibility of combining them under one unit of a higher order (client), the computer centre capability of the payment engine is obtained. In computer centre operation each financial institution hooked up to it has its own set of control data for individual process control.

A computer centre association has two locations RZ X and RX Y, for example (cf FIG. 15) each of which in turn has two physical systems XX1, XX2 and YY1 and YY2. One system in turn has a number of clients. A client constitutes a unit within an R/3 system which is self contained, in terms of commercial law, organisation and technical data. One or more clearing cycles are subdivisions of a client. It should be borne in mind that the clearing circles must be clearly defined throughout the entire computing centre association. Credit institutions which use the payment engine as a payment transaction system are set up as clearing circles in terms of business management. The clearing circles represents a legally independent institution.

For a unified processing logic within the payment engine a format-independent and hence generally useable payment instruction (payment engine metaformat) is implemented. As a result, both domestic and foreign payment transactions can be carried out in one application. Payment instructions may be delivered or passed on as individual or collective instructions. A payment instruction serves to detect a payment process and in normal cases comprises an originator entry and one or more receiver entries.

Generally, a payment instruction (cf FIG. 16) forms the brackets around payment entries. The entries may belong to different types of payment entries:
Originator entries,
Receiver entries,
Clearing entries,
Transaction entries.

The status concept makes it possible to determine the current processing status of a payment instruction in the partial components of the payment engine and the account management system at any time and to complete the processing history. Thus, integrated monitoring of the entire life cycle of a payment instruction is possible. Each user-initiated change in an object, such as a payment instruction, payment entry, route, clearing agreement, etc is recorded in the payment engine in a manner which is secure against revision-by means of amendment documents.

User protocols provide a monitoring functionality over the entire course of the process in the payment engine.

By clearing is meant, in the payment engine, the settling and exchange of payment instructions between credit institutions. The clearing scenarios describe the following aspects:
How are payment instructions exchanged?
How is the equivalent value settled?
The payment engine covers all known clearing scenarios. These include
direct clearing,
clearing with a clearing point and
clearing with a separate covering instruction.

In addition it ensures that payments are bundled in the form of collectors combined with a flexible control of the collector closing criteria.

By direct clearing is meant the transportation of individual payment and collective payment instructions without a clearing point, i.e. payment instructions are exchanged directly and clearing takes place via a direct account link (Loro/Nostro account).

By clearing with a clearing point is meant the transportation of individual and collective payment instructions with a clearing point, i.e. the payment instructions and the clearing are exchanged through a clearing point.

Finally, by clearing with a separate covering procurement is meant the transportation of individual and collective payment instructions with a separate covering procurement through a clearing point (so called garage clearing), i.e. payment instructions are exchanged directly but clearing is carried out through a clearing point.

Exception Control and Later Processing

The overall process of handling payment instructions is broken down inside the payment engine into a logical sequence of processing steps and checks. If in the course of this overall process checks uncover grounds indicating that payment instructions or payment entries should not be further processed, a suitable reaction must ensue. For this purpose the payment engine provides flexible functionalities for controlling exceptions and subsequent processing and thus makes it possible to achieve configurable control of the possible reactions to errors within the processing of payment instructions. Subsequent processing will take place on the basis of the payment engine metaformat.

Currency Exchange

Automatic currency exchange calculates payment entries in which the transaction currency does not correspond to the currency of the account, into the currency of the account. The amount in the currency of the account is booked, the transaction currency and the exchange rate on which the conversion is based are notified. In addition, a currency exchange payment instruction is generated for the correct balancing of currency positions and booked in the account management system.

The payment engine provides functions for handling recalls. There are basically two possible methods of inputting recalls:
The recalls to be sought in the payment engine are supplied together with a file. The recalls are then transmitted to the input interface together with the instructions which are to be processed.
An online interface is made available for inputting recalls within the payment engine.

In order to store data from the file handler databank together with data from the payment engine a corresponding archiving function is provided.

The payment engine provides a clearing concept and thereby ensures the classical 4-eye principle. If clearing is desired, any change (e.g. set up, cancellation, data amendment or activation or deactivation of routes, clearing agreement, rules and clearing institutions have to be cleared by a second user.

According to the invention, a computing centre capability is provided which arises from the separation of the client and clearing circle. A number of account-managing units may be provided for each clearing circle and hence a number of bank accounting circles (cf. FIGS. 15 and 16). This makes it possible to combine individual payment engines to form one computing centre and, at a higher level, to combine individual computing centres to form one computing centre association.

Advantages of the Invention

Flexible integrated solution for domestic and foreign payment transactions

Format-neutral processing

Computing centre capability

Exception control and subsequent processing functionality

High performance (capable of parallel working and scaling up)

Customer-specific expansions possible without affecting the standard

Preparation for intraday interest charging

Open integration platform for payments and bookings between different stock-administering systems (SAP and non-SAP systems)

Supports "Straight Through Processing" (STP)

High integration and clear interfaces, low implementation costs in core banking

High level of automation in controlling payment transactions

Reduction of operating costs by synergies when running a number of SAP components.

What is claimed is:

1. A computer-implemented method for processing electronic payment instructions, comprising:
separating, by an instruction input processor apparatus, total instruction data associated with a payment instruction into payment instruction data needed for processing the payment instruction and accounting data not needed for processing the payment instruction;
converting the payment instruction data into a uniform metaformat for subsequent payment processing, the uniform metaformat comprising the payment instruction;

storing the accounting data temporarily in a file handler databank together with a reference to the payment instruction;

processing the converted payment instruction data, the processing including an automatic payment routing identification and payment clearing identification and, depending on the payment clearing identification, internal preparation of the payment instruction; and converting automatically generated data relating to an outgoing payment instruction associated with the payment instruction into a target data format and supplementing the generated data with the accounting data temporarily stored in the file handler databank.

2. The method according to claim 1, wherein the originator of the payment instruction is automatically checked and, after a positive outcome to the check, the payment instruction is immediately transmitted to an instruction output processor for conversion into the target data format.

3. The method according to claim 1, wherein the internal preparation of the payment instruction entry includes an internal reservation of the payment instruction.

4. The method according to claim 3, wherein the reservation is made in originator-oriented and/or receiver-oriented manner.

5. The method according to claim 3, wherein at a given time the reservation is automatically combined to form a collective instruction entry.

6. The method according to claim 5, wherein the collective instruction entry is formed by accumulation of reservations based on originator entries.

7. The method according to claim 5, wherein the collective instruction entry is formed by accumulation of reservations based on receiver entries.

8. The method according to claim 1, wherein the uniform metaformat further comprises data specific to intended use, reporting data and customer specific fee information.

9. The method according to claim 1, wherein the accounting data used to supplement the generated data is identified by the reference to the payment instruction.

10. The method according to claim 1, wherein the converting the payment instruction data into a uniform metaformat is performed by a format converted selected by the instruction input processor apparatus based on information associated with the payment instruction.

11. An apparatus for processing electronic payment instructions, comprising:

a processor; and a memory coupled to the processor, the memory storing instructions adapted to be executed by the processor to:

separate total instruction data associated with a payment instruction into payment instruction data needed for processing the payment instruction and accounting data not needed for processing the payment instruction;

convert the payment instruction data into a uniform metaformat for subsequent payment processing, the uniform metaformat comprising the payment instruction;

store the accounting data temporarily together with a reference to the payment instruction;

process the converted payment instruction data, the processing including an automatic payment routing identification and payment clearing identification and, depending on the payment clearing identification, internal preparation of the payment instruction; and convert automatically generated data relating to an outgoing payment instruction associated with the payment instruction into a target data format and supplementing the generated data by the accounting data temporarily stored in the file handler databank.

12. The apparatus according to claim 11, wherein the originator of the payment instruction is automatically checked and, after a positive outcome to the check, the payment instruction is immediately transmitted to the output processor for conversion into the target data format.

13. The apparatus according to claim 11, wherein the internal preparation of the payment instruction entry includes an internal reservation of the payment instruction.

14. The apparatus according to claim 13, wherein the reservation is made in originator-oriented and/or receiver-oriented manner.

15. The apparatus according to claim 13, wherein at a given time the reservation is automatically combined to form a collective instruction entry.

16. The apparatus according to claim 15, wherein the collective instruction entry is formed by accumulation of reservations based on originator entries.

17. The apparatus according to claim 15, wherein the collective instruction entry is formed by accumulation of reservations based on receiver entries.

18. The apparatus according to claim 11, wherein the uniform metaformat further comprises data specific to intended use, reporting data and customer specific fee information.

19. The apparatus according to claim 11, wherein the accounting data used to supplement the generated data is identified by the reference to the payment instruction.

20. The apparatus according to claim 11, wherein the format converter is selected by the input manager based on information associated with the payment instruction.

* * * * *